United States Patent [19]

Wells et al.

[11] Patent Number: 5,535,369

[45] Date of Patent: Jul. 9, 1996

[54] METHOD FOR ALLOCATING MEMORY IN A SOLID STATE MEMORY DISK

[75] Inventors: Steven Wells, Citrus Heights; Robert N. Hasbun, Shingle Springs, both of Calif.; Sara Domonkos, Portage, Mich.; Steven S. Barbarich, Carmichael, Calif.

[73] Assignee: Intel Corporation, Santa Clara, Calif.

[21] Appl. No.: 485,661

[22] Filed: Jun. 7, 1995

Related U.S. Application Data

[63] Continuation of Ser. No. 969,138, Oct. 30, 1992, abandoned.

[51] Int. Cl.[6] .................................................. G06F 12/02
[52] U.S. Cl. .................. 395/497.02; 395/600; 395/430;
       364/DIG 1; 364/246.2; 364/246; 364/249.3
[58] Field of Search ............................ 395/430, 497.02,
                                                                 395/600

[56] References Cited

U.S. PATENT DOCUMENTS

| | | | |
|---|---|---|---|
| 3,648,255 | 3/1972 | Beausoleil et al. | 395/425 |
| 3,729,712 | 4/1973 | Glassman | 395/425 |
| 4,528,624 | 7/1985 | Kamionka et al. | 395/425 |
| 4,642,759 | 2/1987 | Foster | 395/500 |
| 4,644,494 | 2/1987 | Muller | 395/425 |
| 4,758,944 | 7/1988 | Bartley et al. | 395/425 |
| 4,763,305 | 8/1988 | Kuo | 365/200 |
| 4,802,117 | 1/1989 | Chrosny et al. | 371/10.1 |
| 4,896,262 | 1/1990 | Wayama et al. | 395/500 |
| 4,958,315 | 9/1990 | Balch | 395/500 |
| 5,012,425 | 4/1991 | Brown | 364/464.02 |
| 5,070,474 | 12/1991 | Tuma et al. | 395/500 |
| 5,101,490 | 3/1992 | Getson, Jr. et al. | 395/425 |
| 5,111,385 | 5/1992 | Hattori | 395/425 |
| 5,131,089 | 7/1992 | Cole | 395/500 |
| 5,199,033 | 3/1993 | McGeoch et al. | 371/10.1 |
| 5,200,959 | 4/1993 | Gross et al. | 371/21.6 |
| 5,237,673 | 8/1993 | Orbits et al. | 395/425 |
| 5,339,411 | 8/1994 | Heaton, Jr. | 395/600 |

FOREIGN PATENT DOCUMENTS

| | | |
|---|---|---|
| 2088442 | 7/1993 | Canada . |
| 0175458A2 | 3/1986 | European Pat. Off. . |
| 0392895 | 10/1990 | European Pat. Off. . |
| 2251324 | 1/1992 | United Kingdom . |
| 2251323 | 1/1992 | United Kingdom . |

OTHER PUBLICATIONS

Solid–State Mass Storage Arrives, Product Feature, Memory Card Systems & Design, Jul./Aug. 1992.
Optimal Solid State Disk Architecture for Portable Computers, Dan Auclair, pp. 811–815, Proceedings of Silicon Vally P.C. Design Conference, July 9, 1991.

*Primary Examiner*—Eddie P. Chan
*Assistant Examiner*—Reginald G. Bragdon
*Attorney, Agent, or Firm*—Blakely, Sokoloff, Taylor & Zafman

[57] ABSTRACT

A method of allocating free physical memory in a solid state memory disk for a sector of data of a given size is described. Allocation begins by determining whether sufficient free memory remains in the block to which the previous sector of data was written. If there is not sufficient free memory remaining, then selection of another block to allocate the sector of data begins. The selection is based on the sum of the amount of free memory in a selected block and one of the following: 1) the amount of invalid data in the block; 2) the cycle count for the block; 3) the amount of invalid data as compared to a maximum amount of invalid data for all non-volatile memory devices associated with the block; and 4) the number of blocks already allocated to all non-volatile memory devices associated with the block. Afterward, the block with the greatest amount of available memory is selected to store the sector of data.

12 Claims, 22 Drawing Sheets

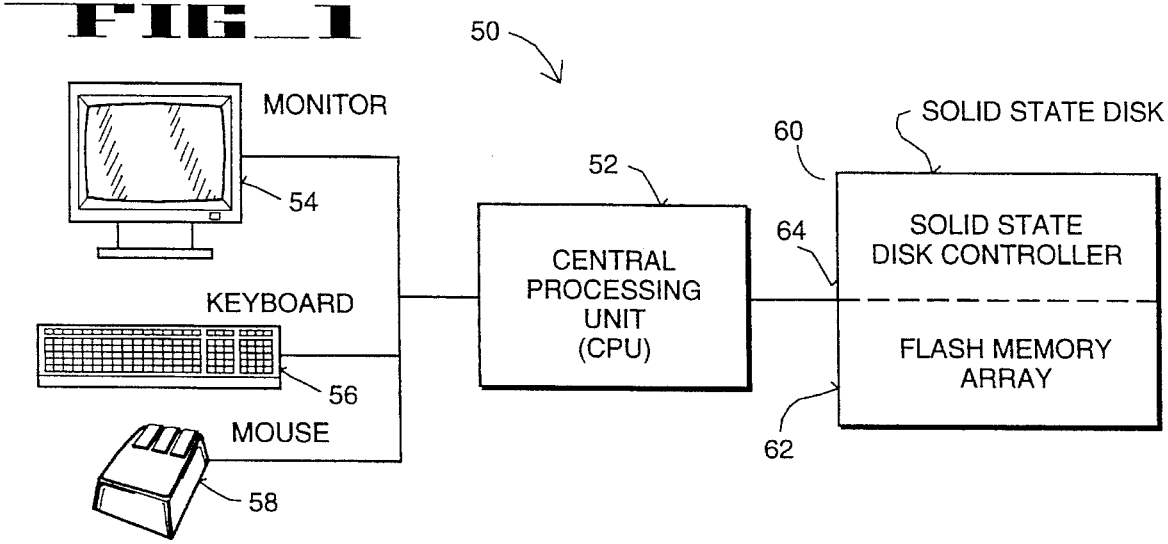
FIG_1
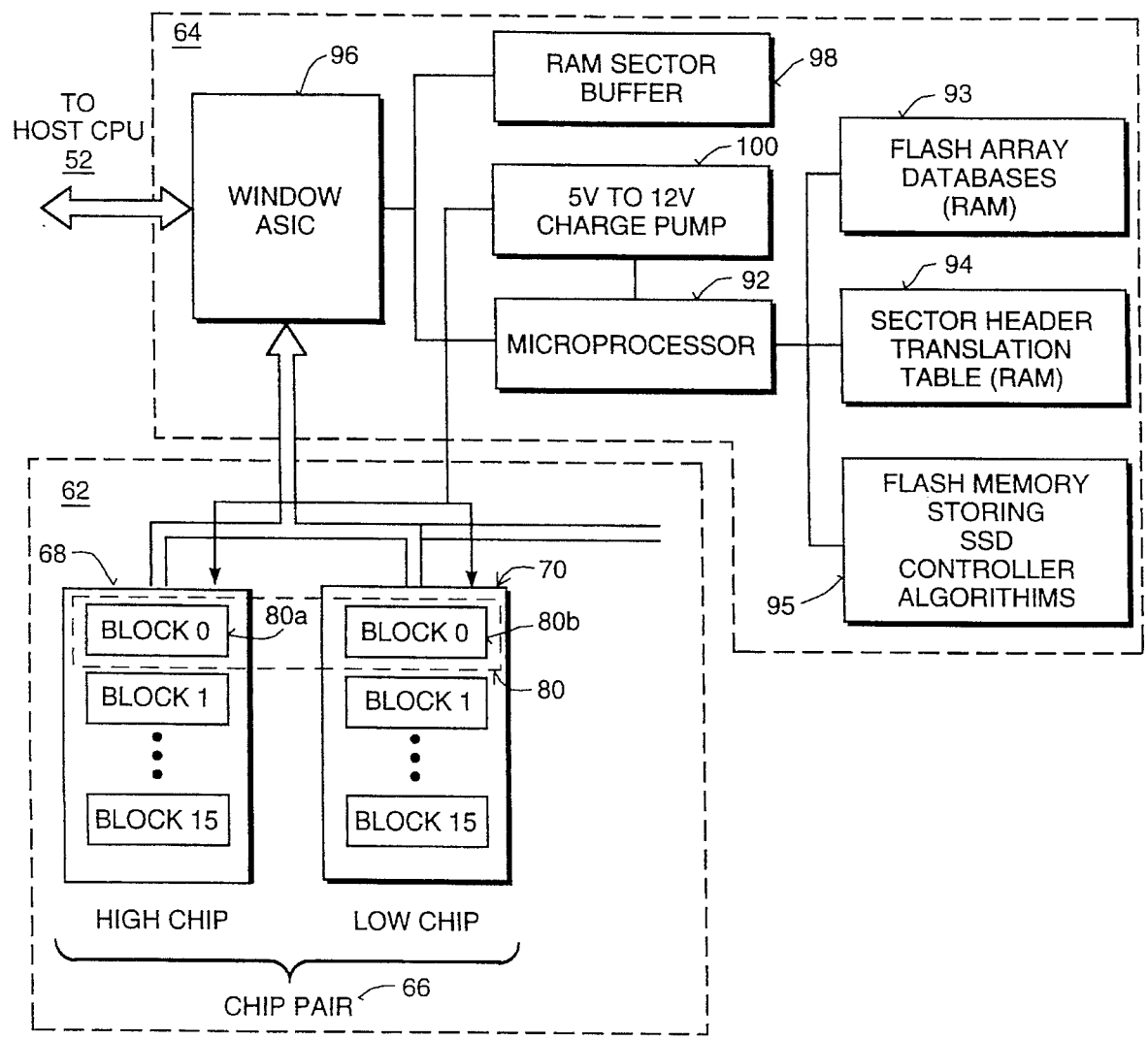
FIG_2

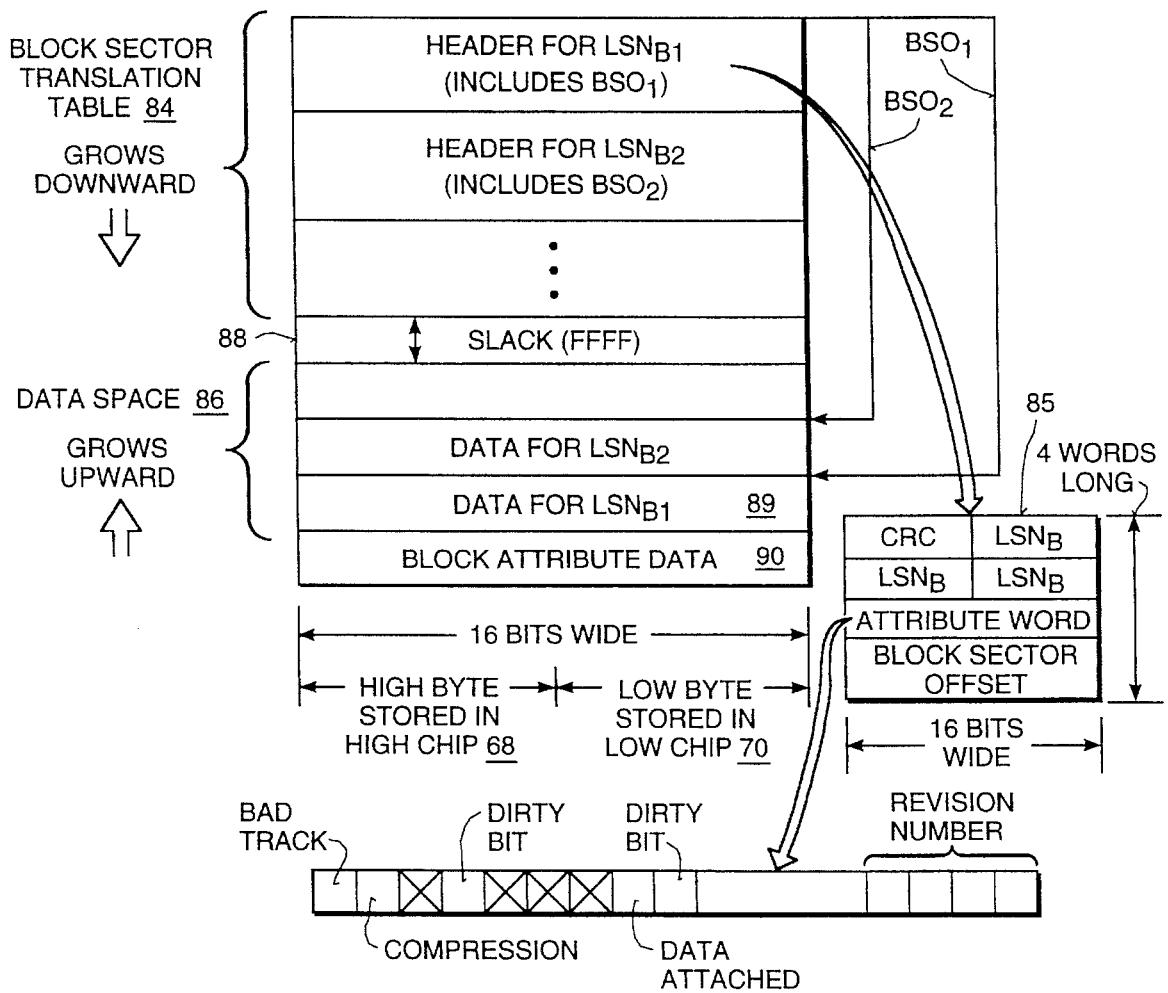
FIG_3
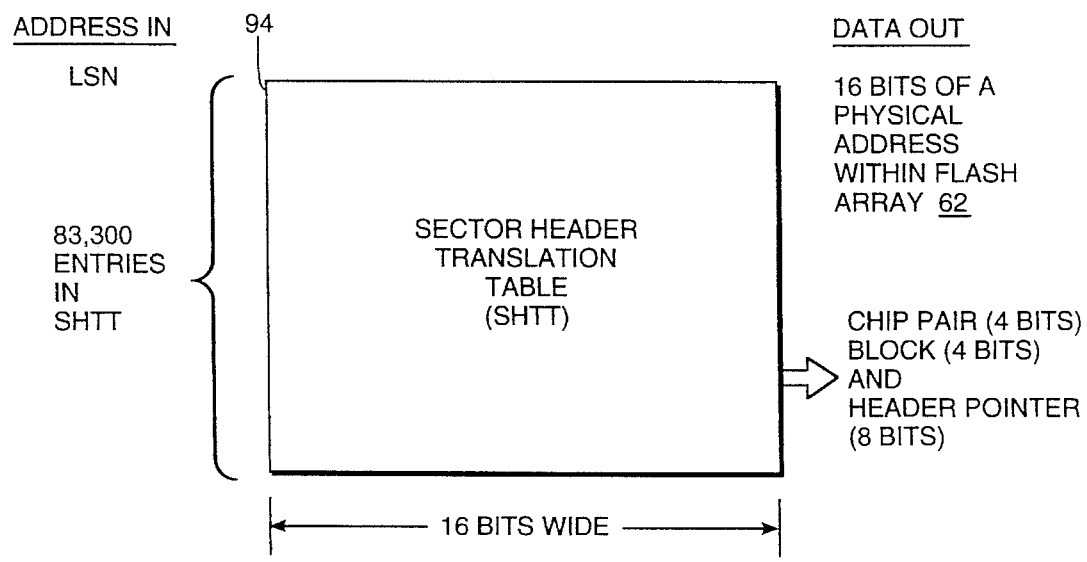
FIG_4

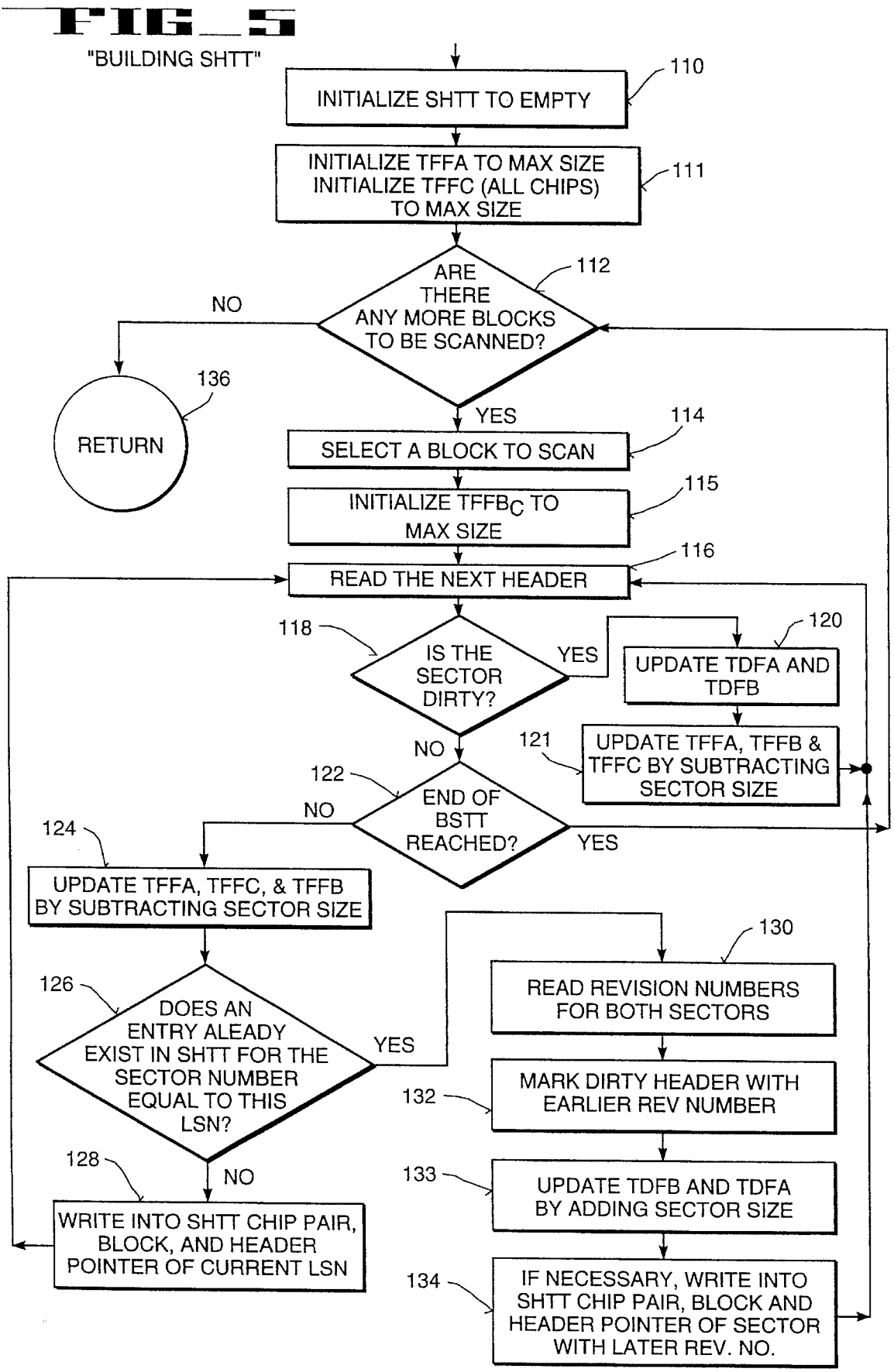
FIG_5 "BUILDING SHTT"

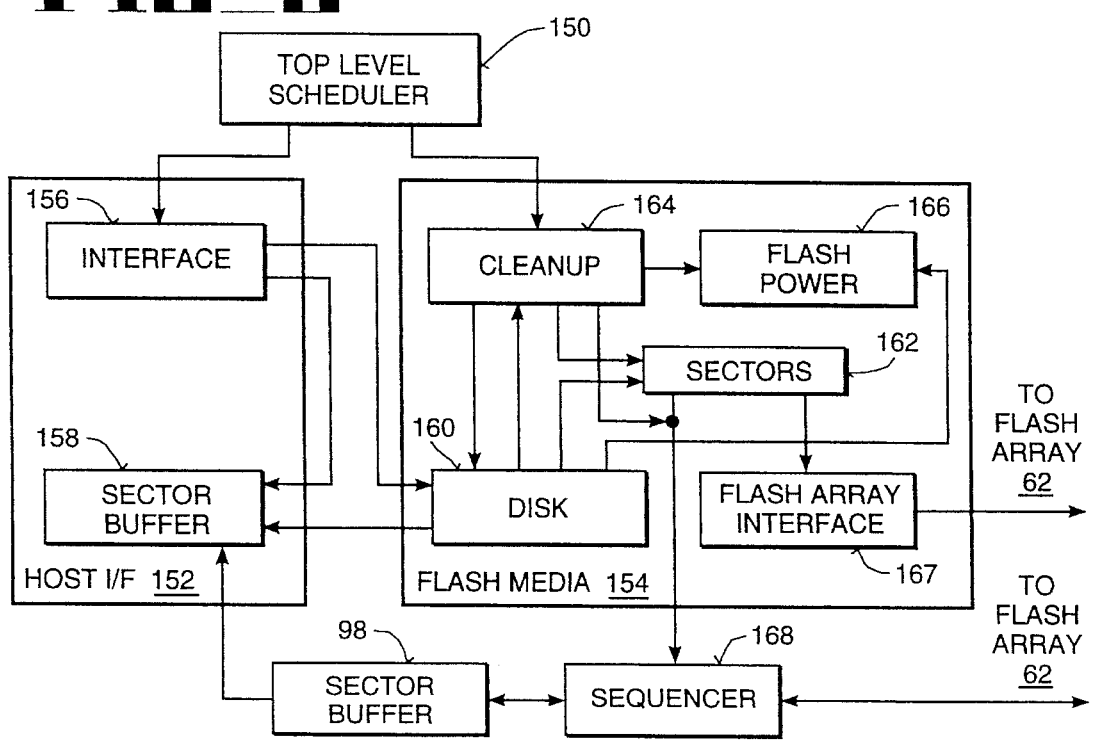
FIG_6
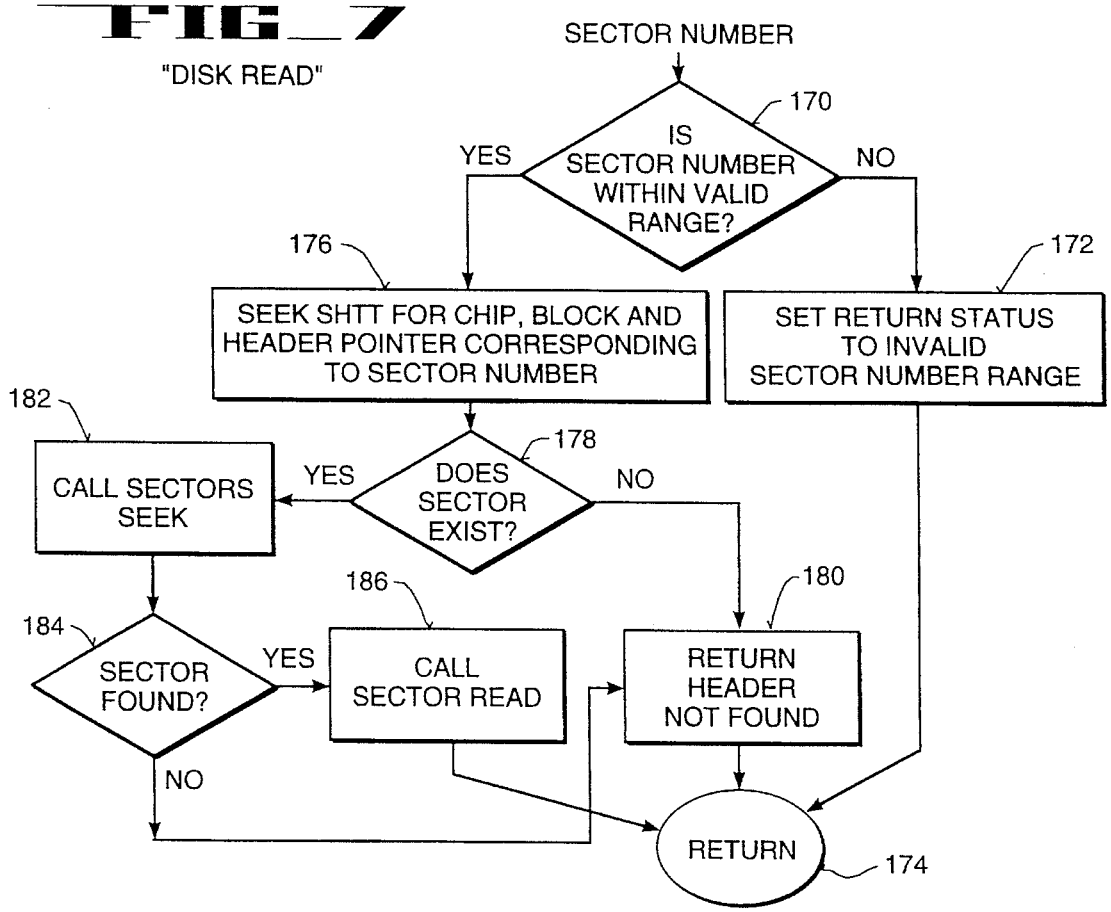
FIG_7 "DISK READ"

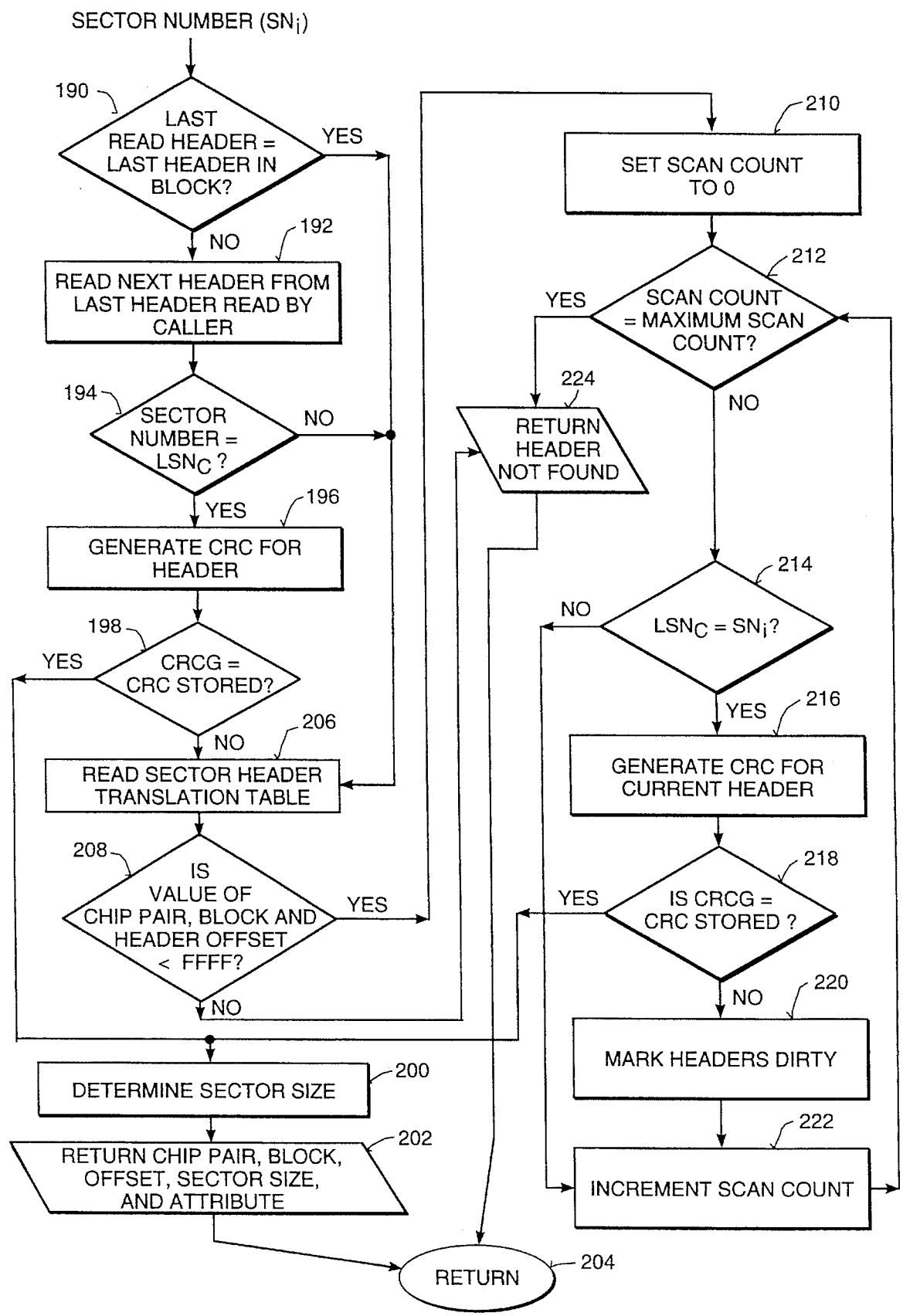

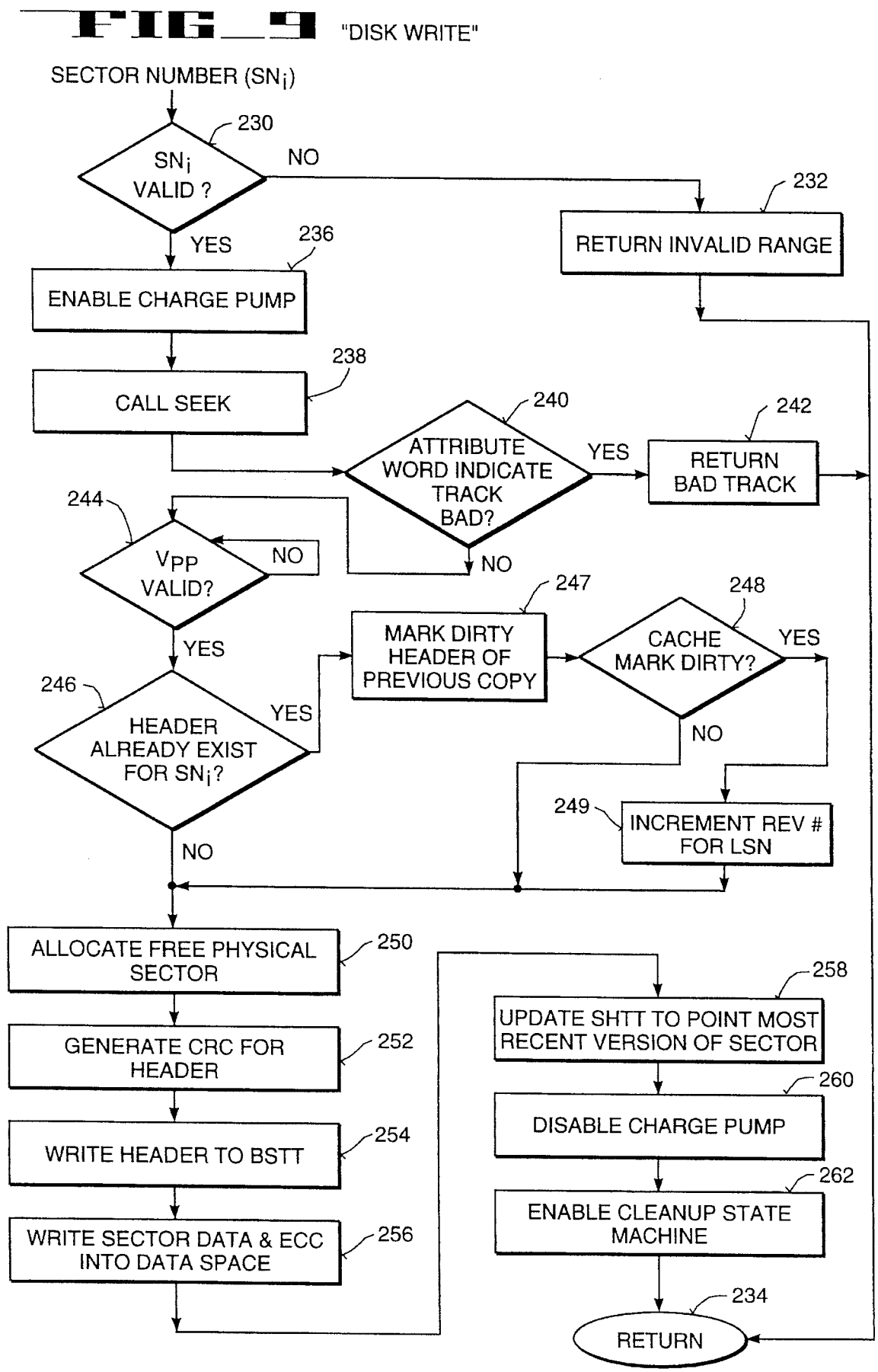
FIG_9 "DISK WRITE"

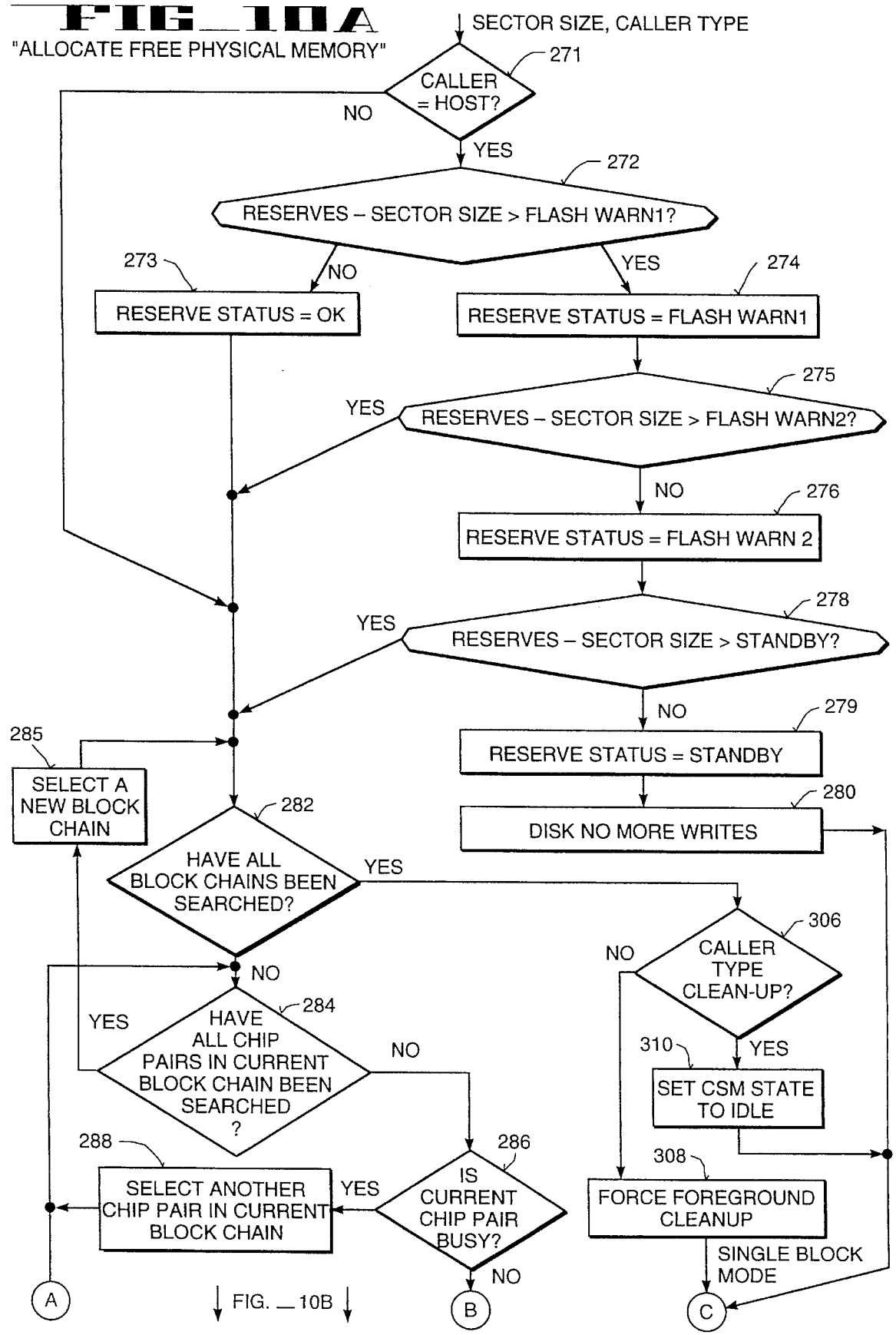

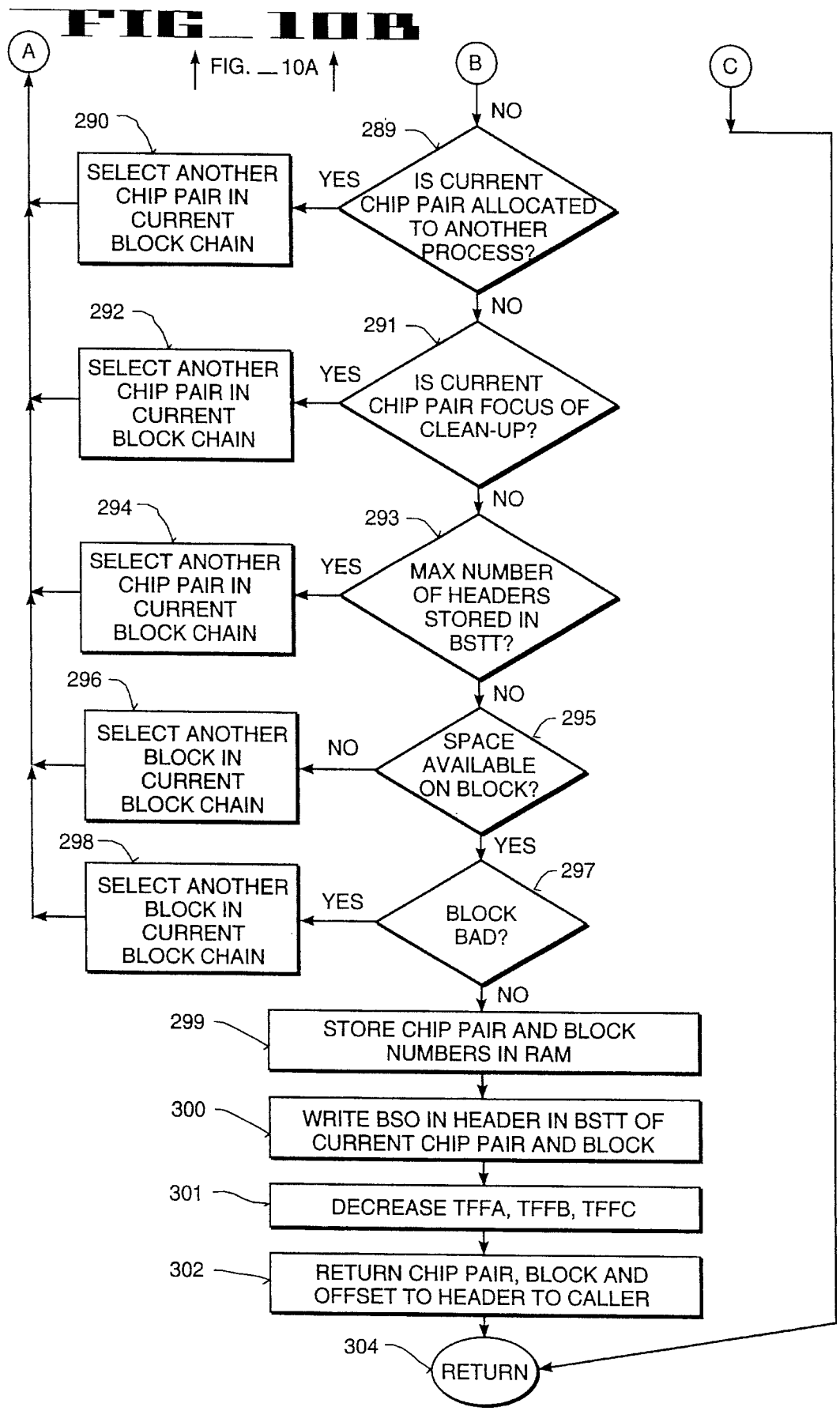
FIG._10B

FIG_11
STARTING BLOCK OF WRITE
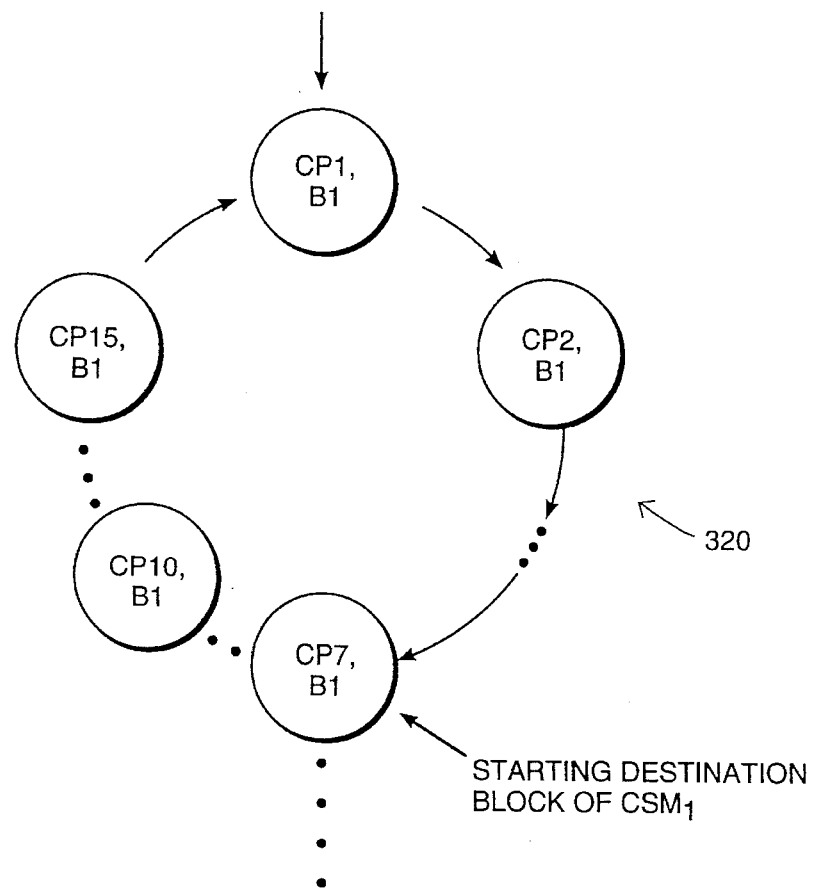
STARTING DESTINATION BLOCK OF $CSM_1$
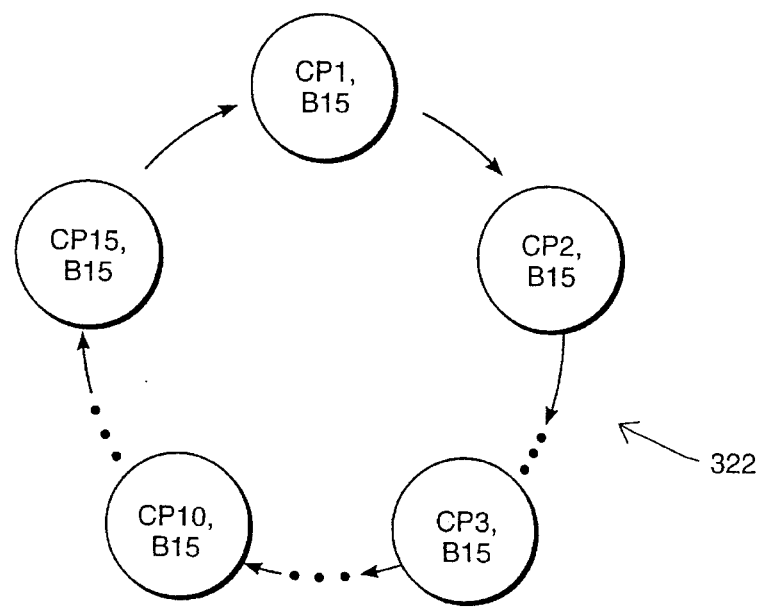

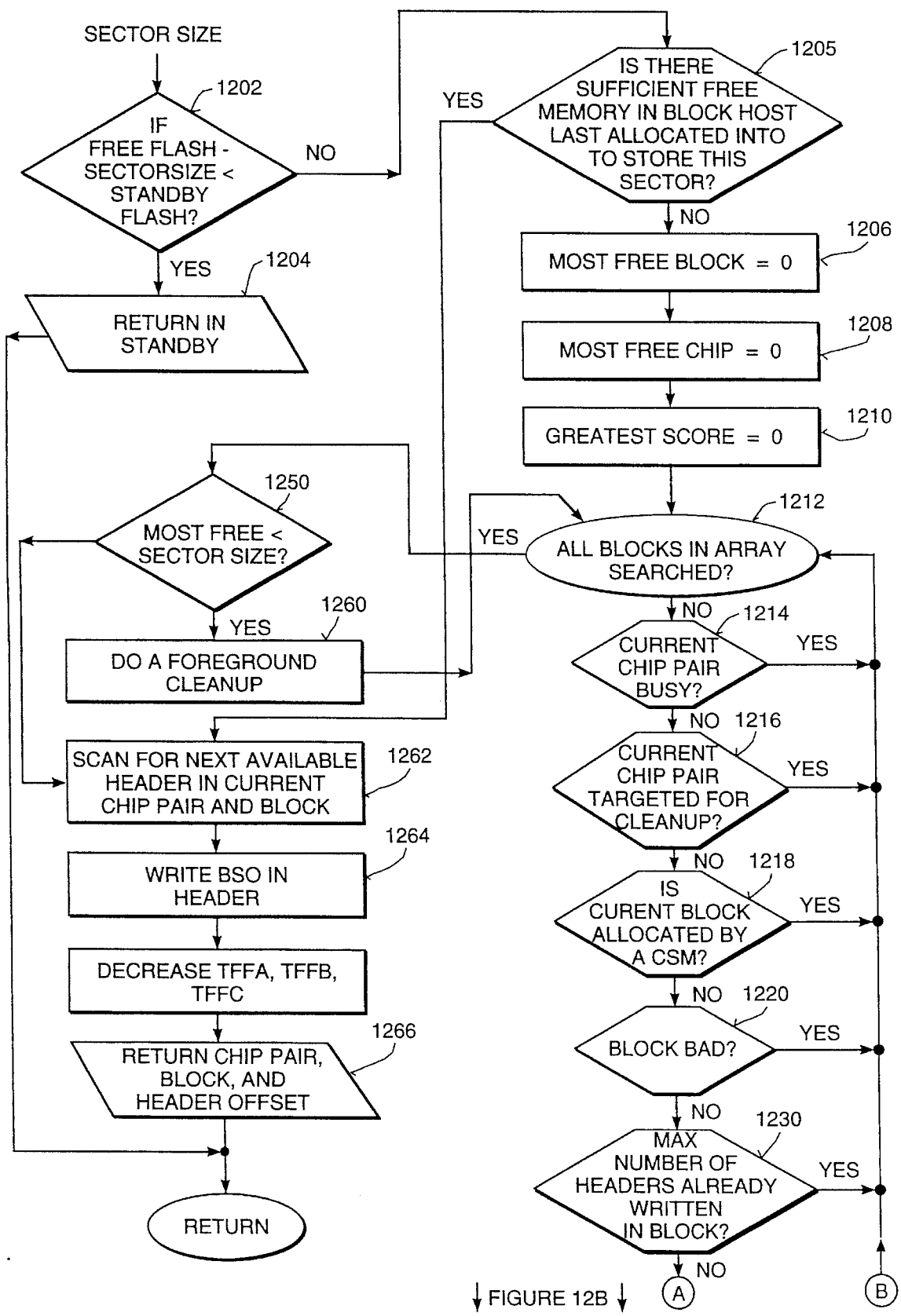

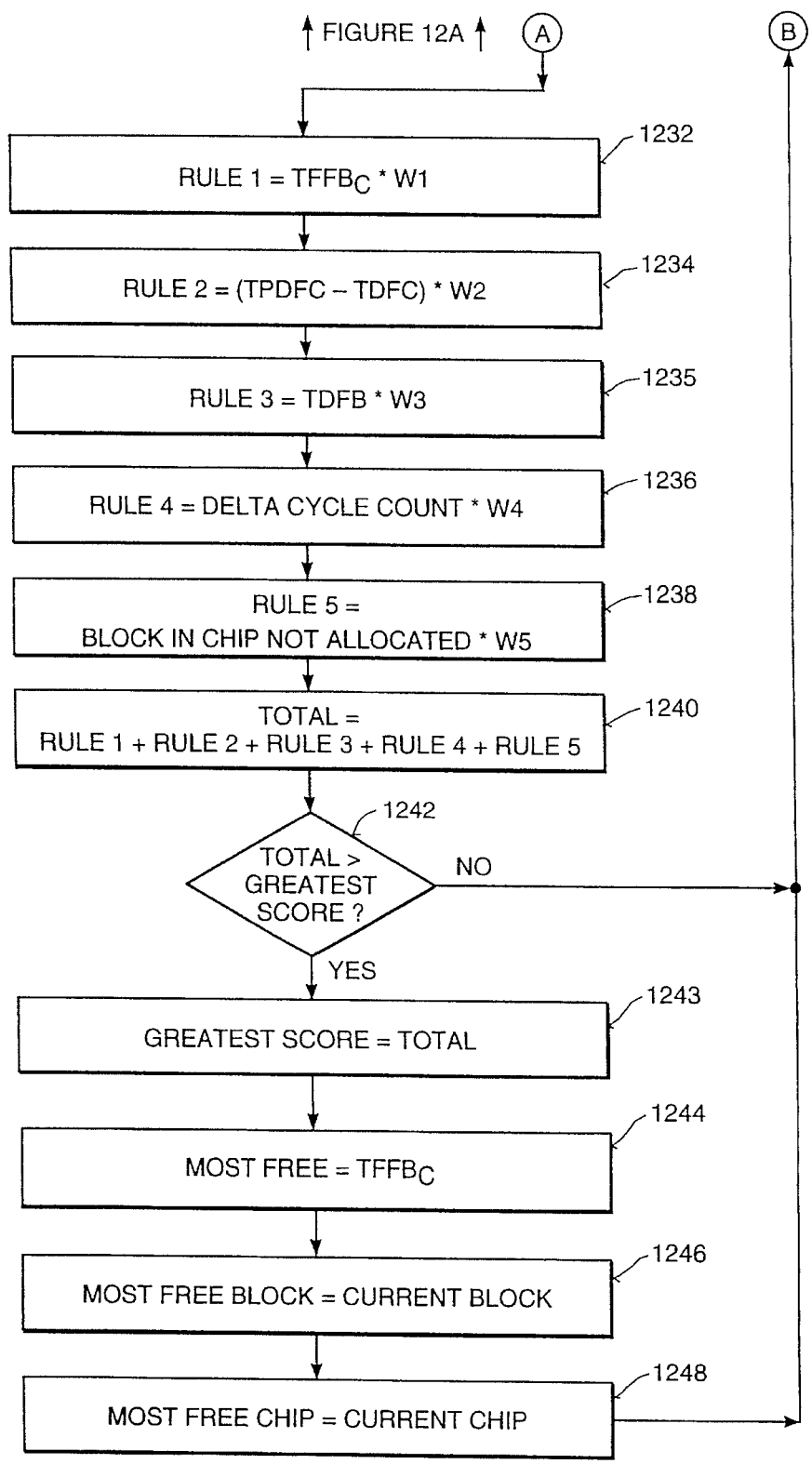
FIG_12B "ALLOCATE FREE PHYSICAL MEMORY TO HOST"

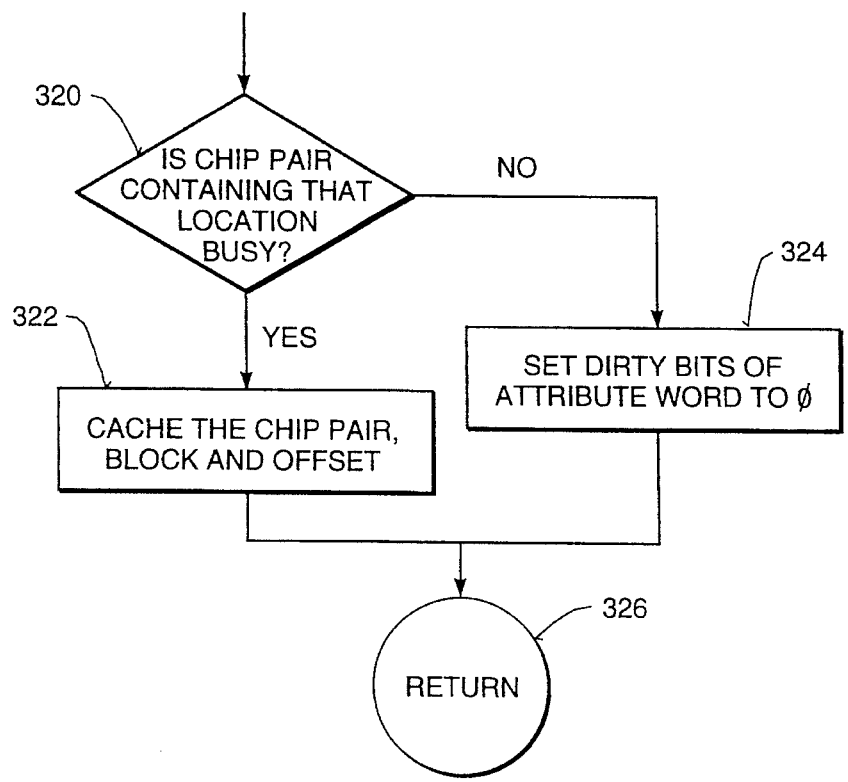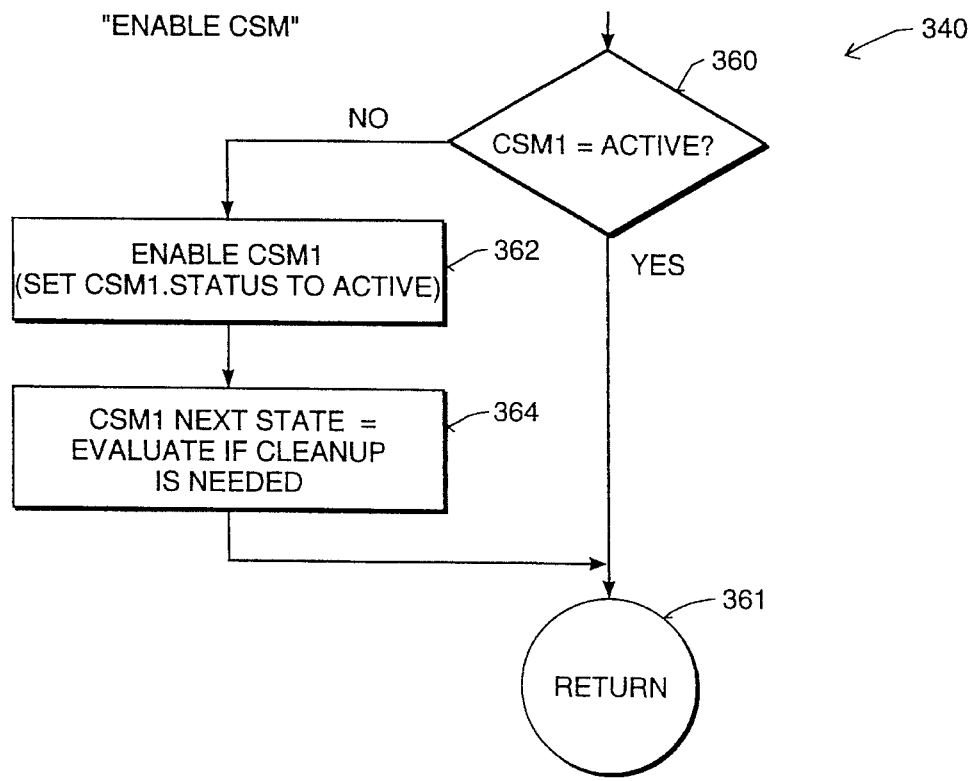

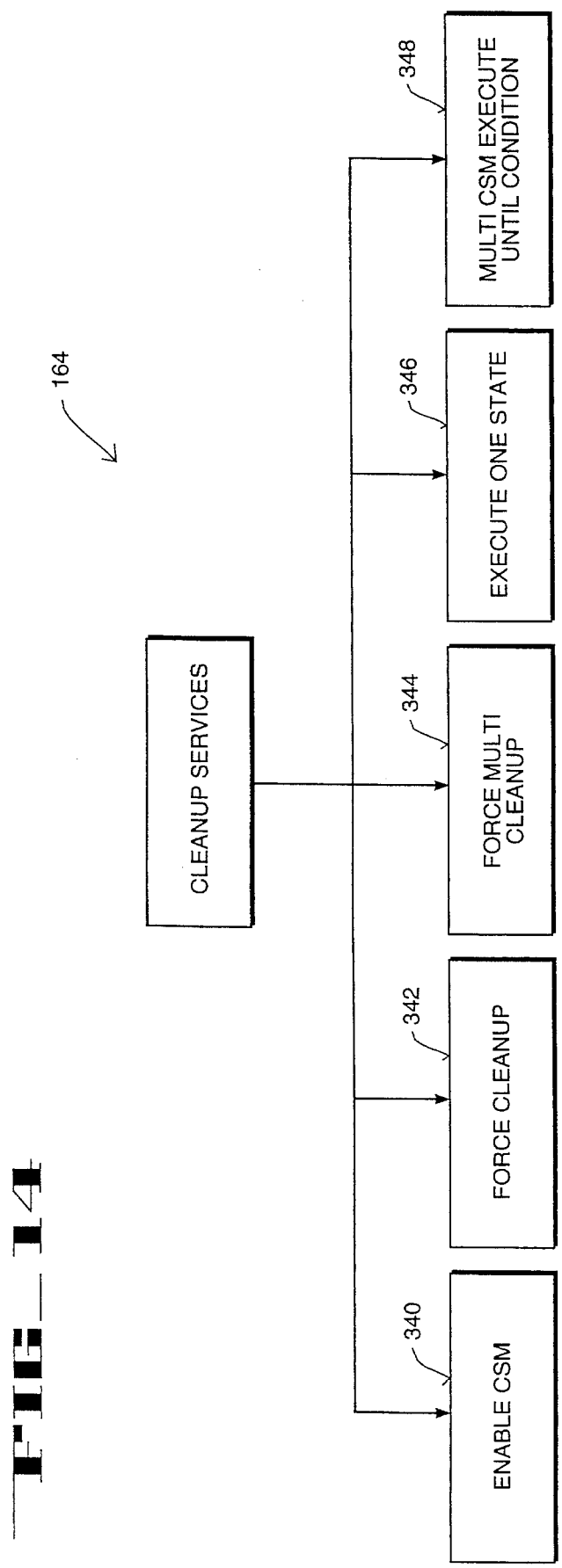
FIG_14

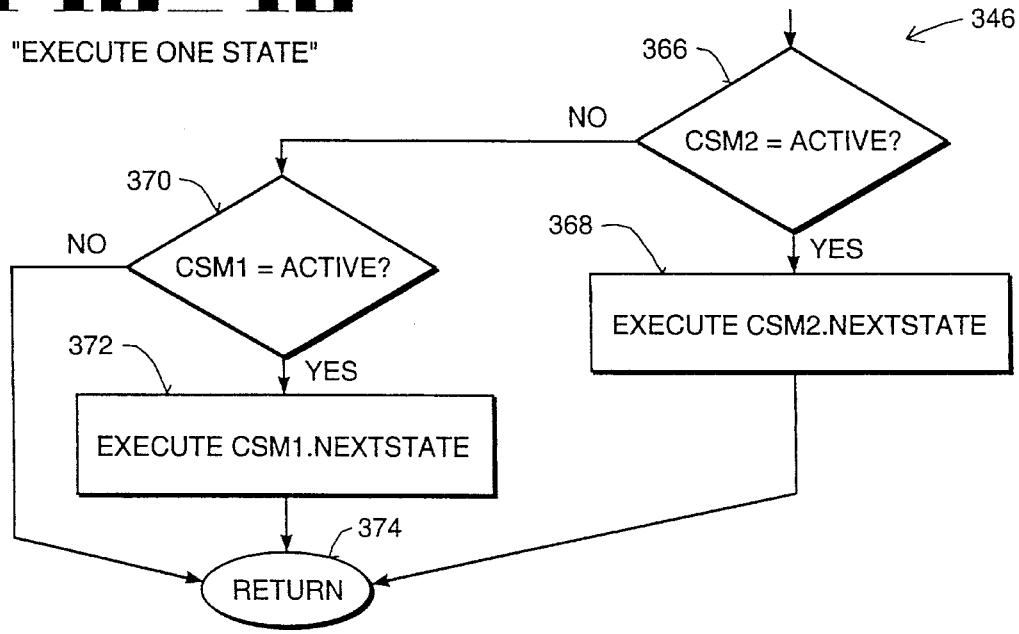
FIG_16 "EXECUTE ONE STATE"
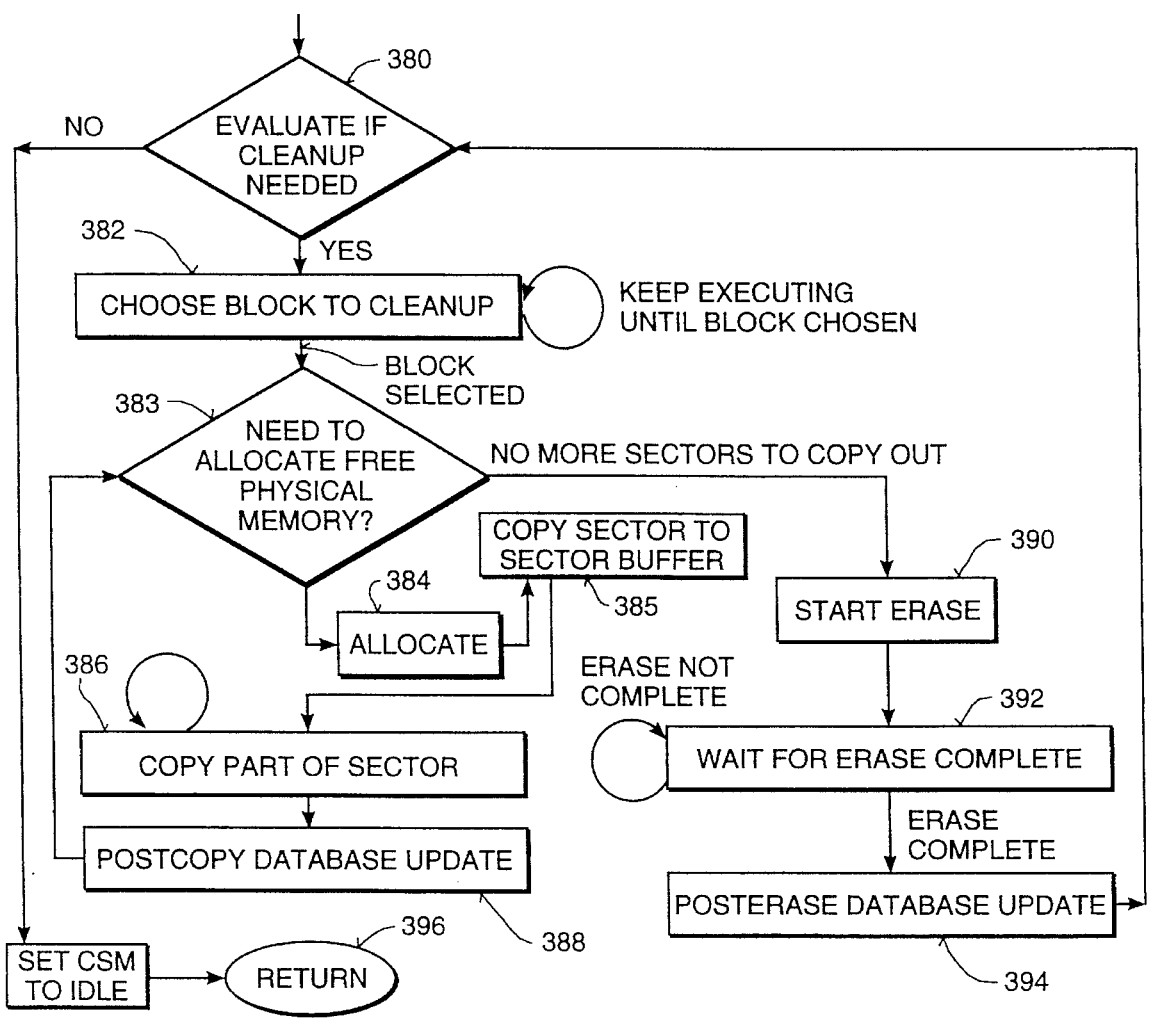
FIG_17 "STATES OF CLEAN-UP STATE MACHINE"

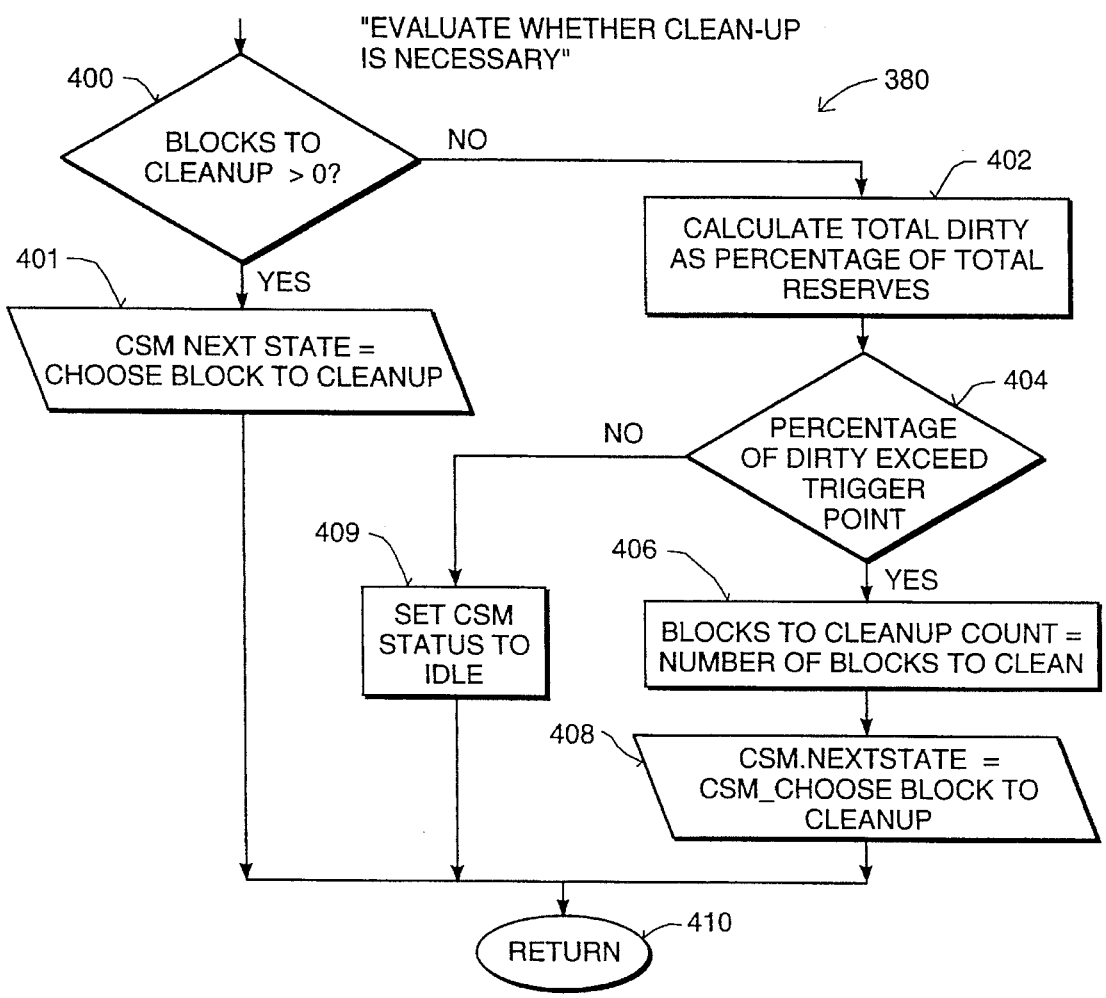
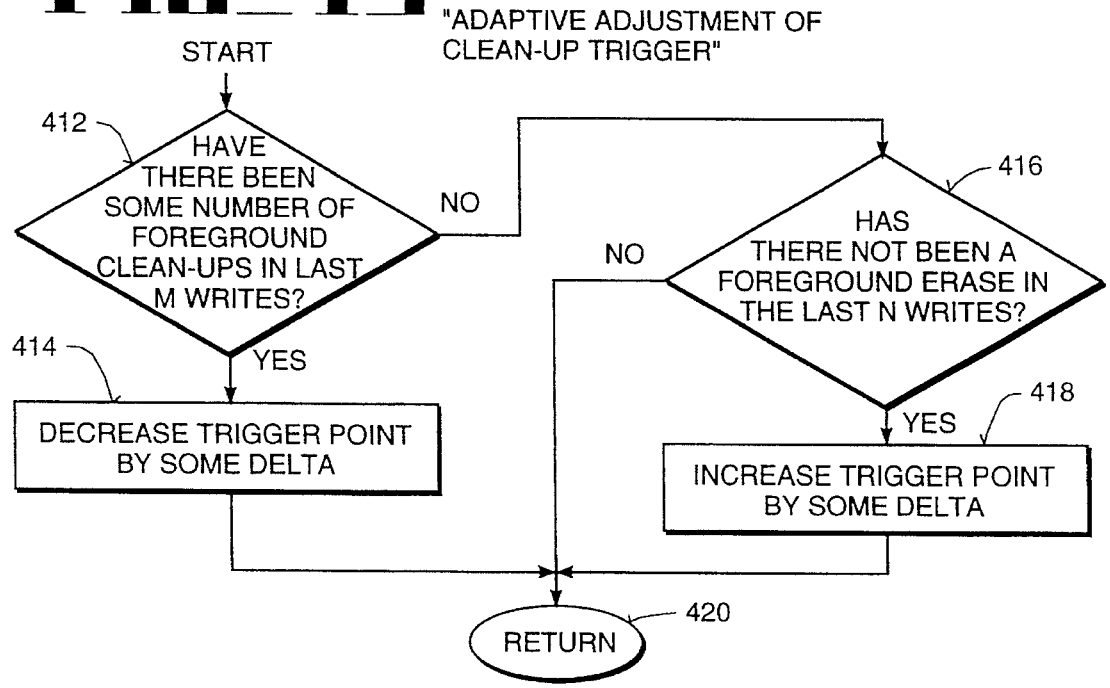

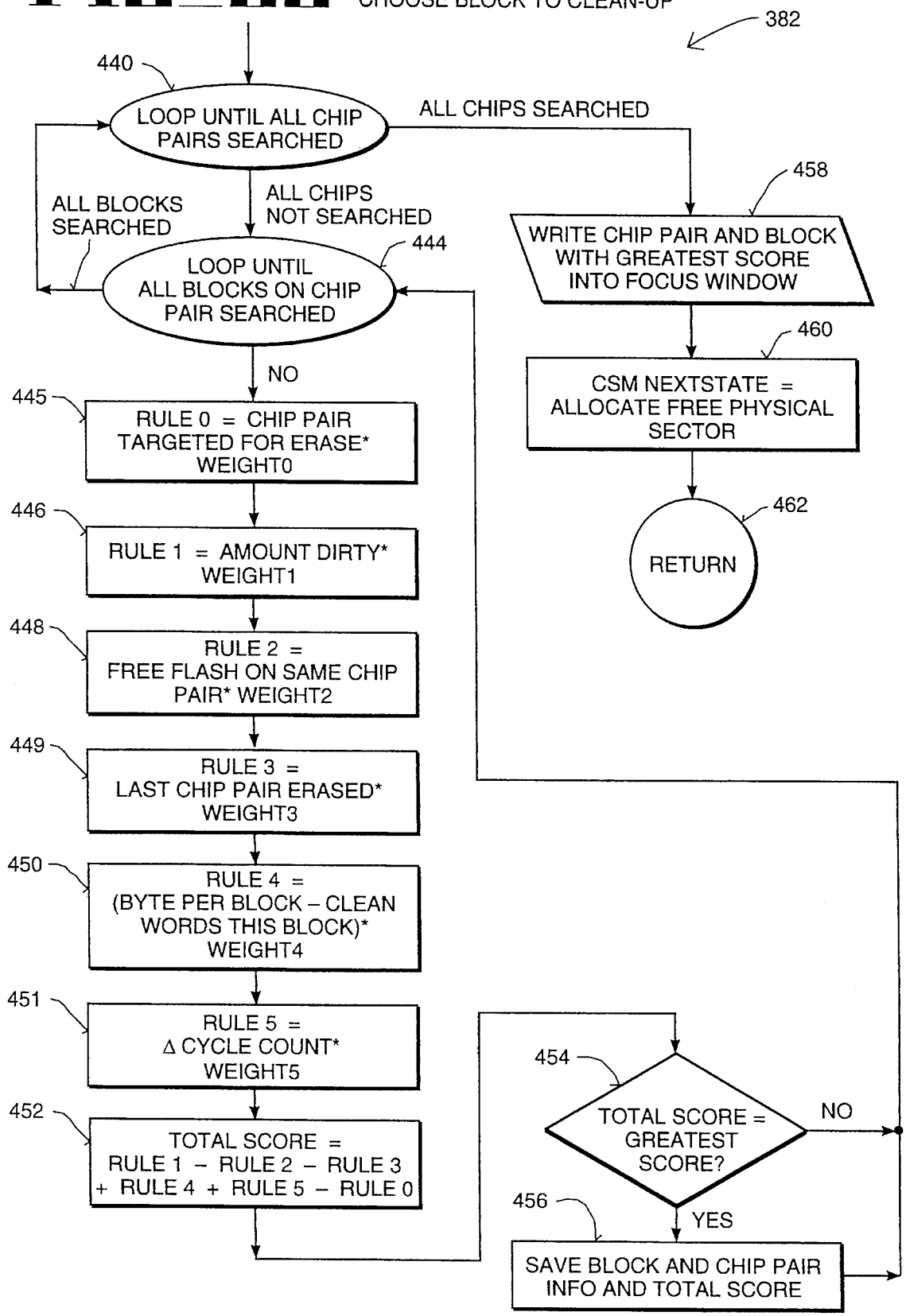

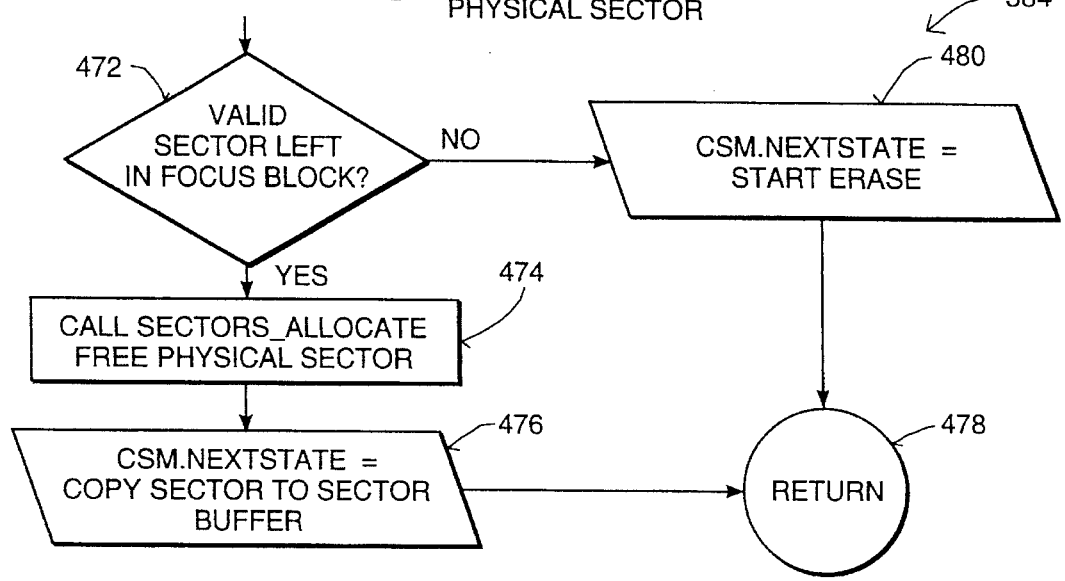
FIG_21 "CSM ALLOCATE FREE PHYSICAL SECTOR"
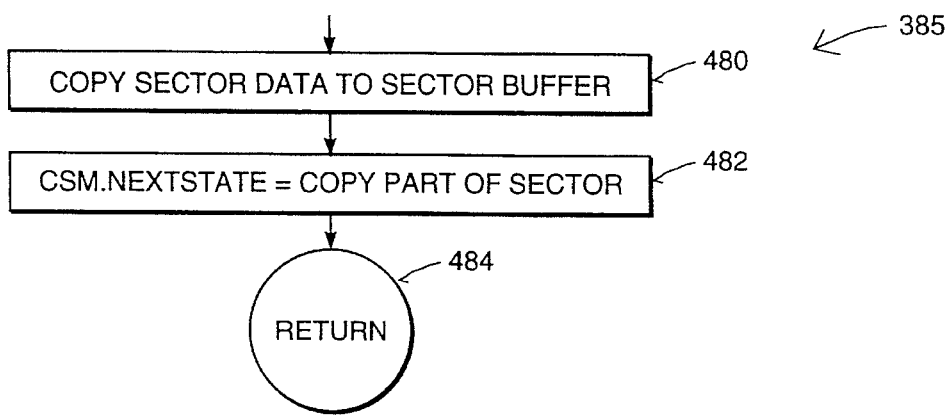
FIG_23 "COPY SECTOR TO SECTOR BUFFER"
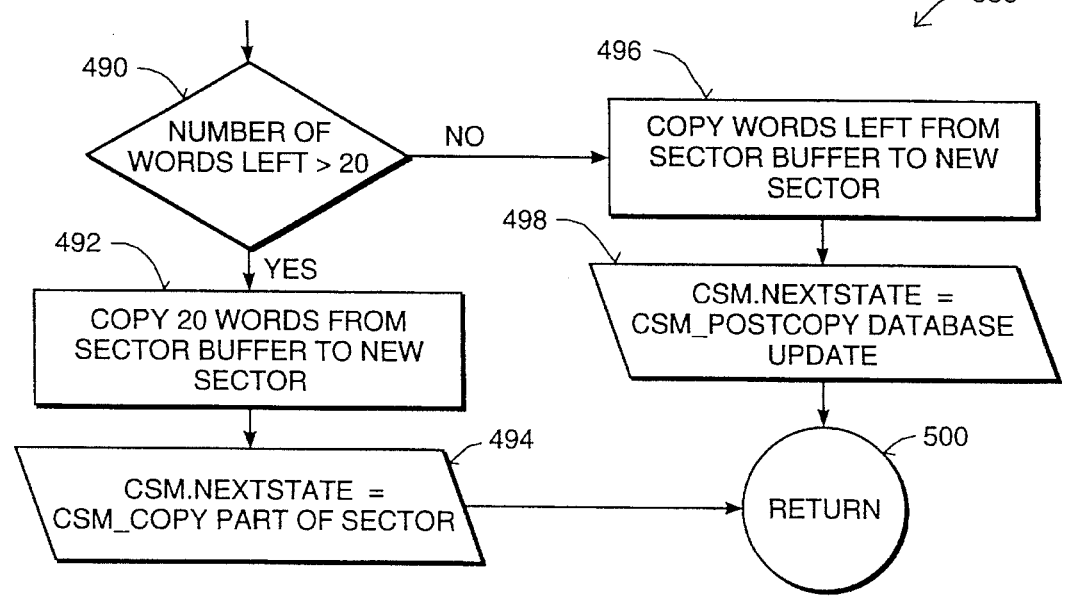
FIG_24 "COPY PART OF SECTOR"

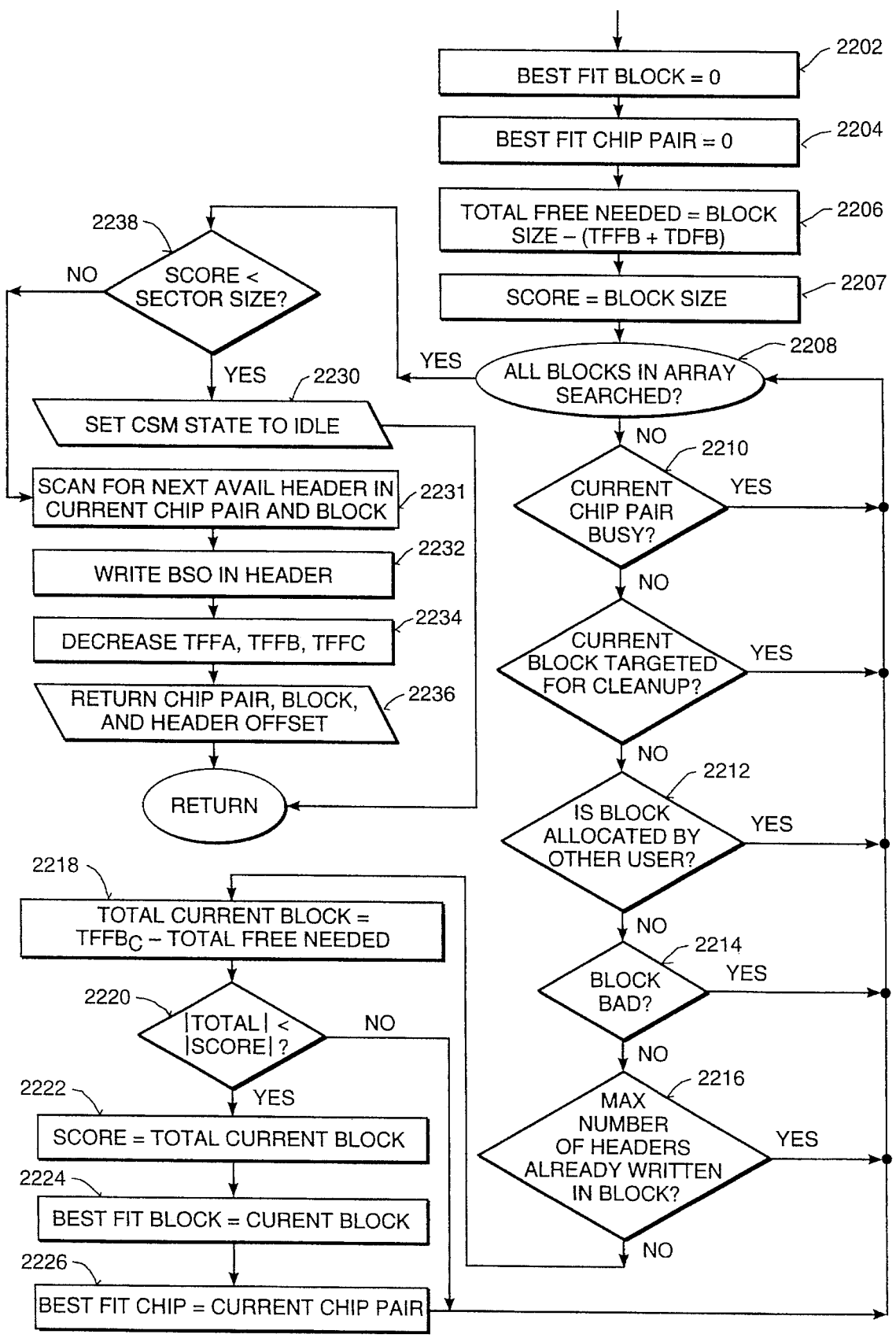
FIG_22 "ALLOCATE FREE PHYSICAL MEMORY TO CSM"

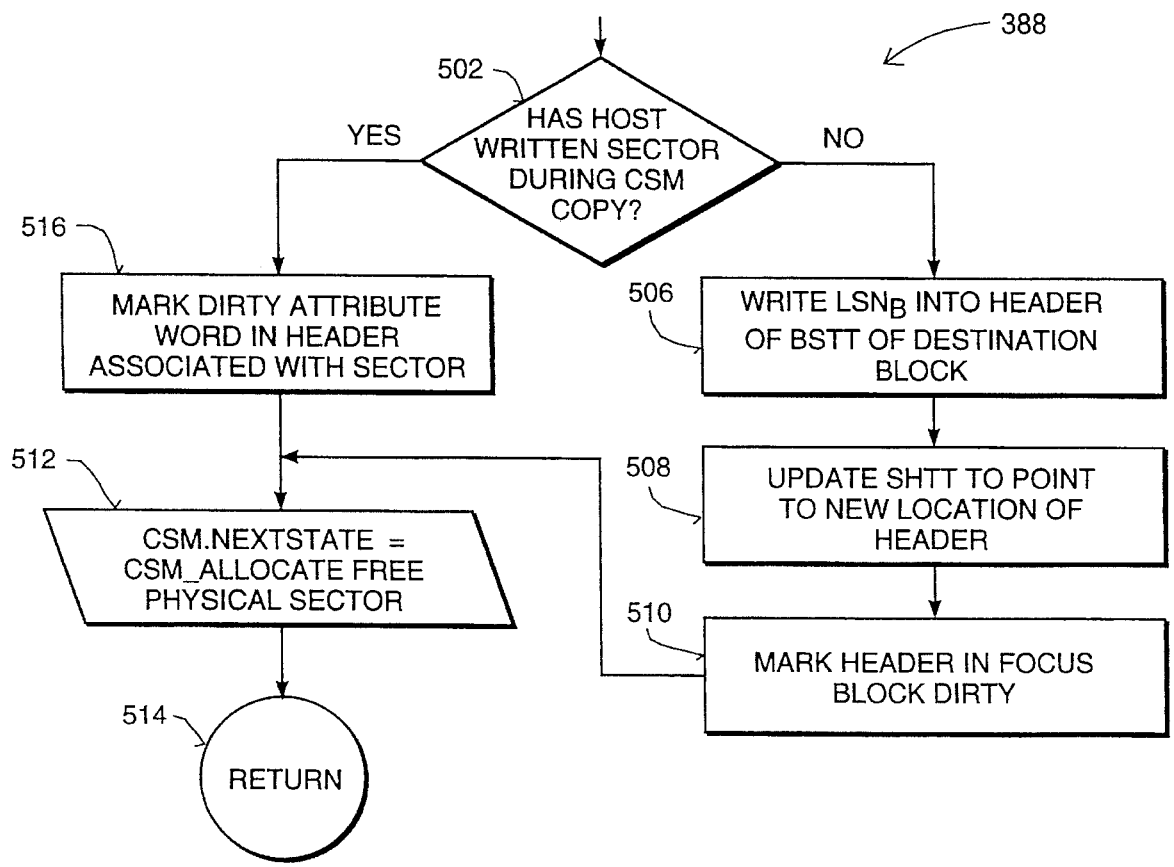
FIG_25. "POST COPY DATABASE UPDATE"
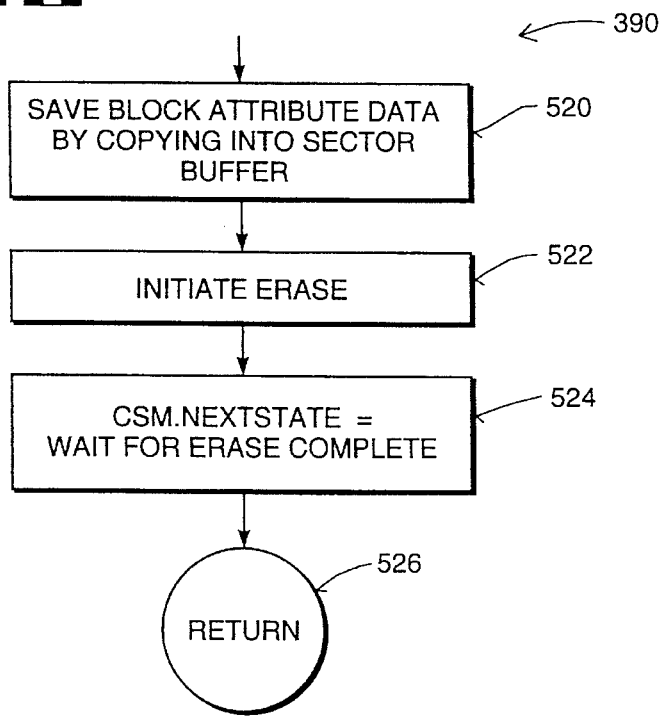
FIG_26 "START ERASE"

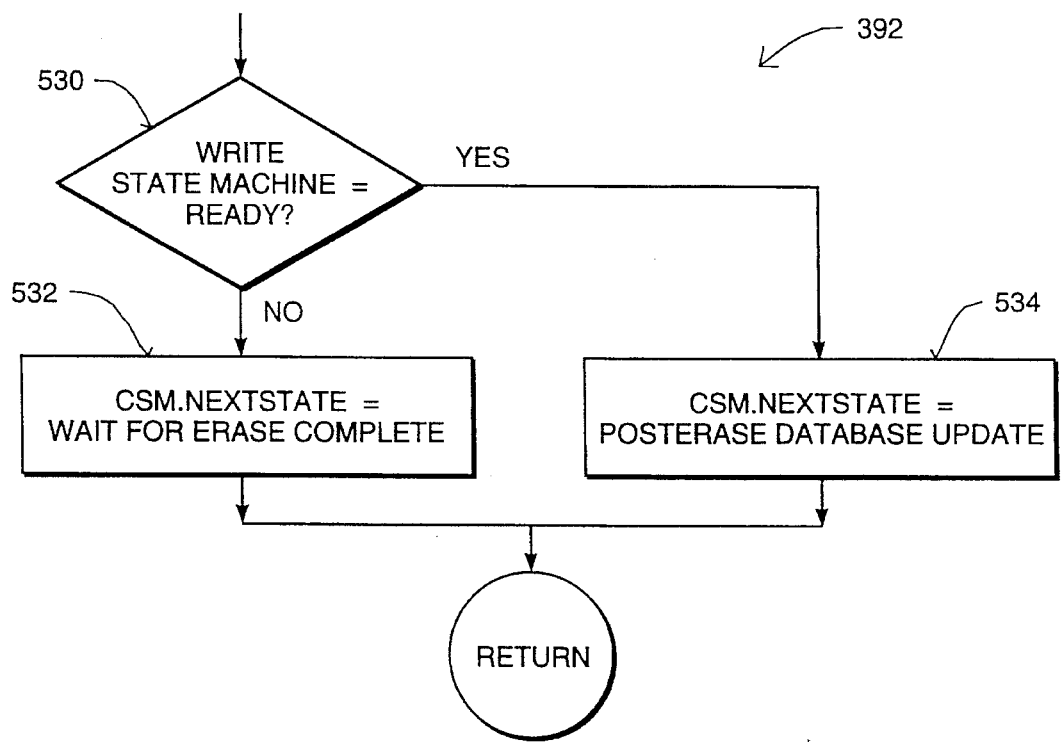
FIG_27 "WAIT FOR ERASE COMPLETE"
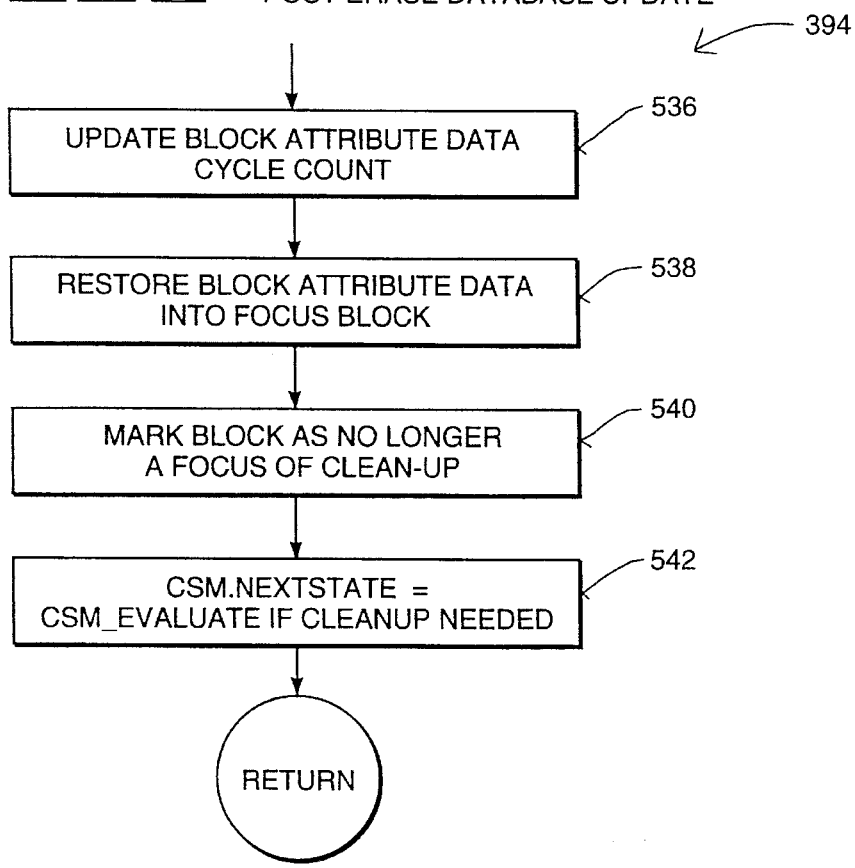
FIG_28 "POST ERASE DATABASE UPDATE"

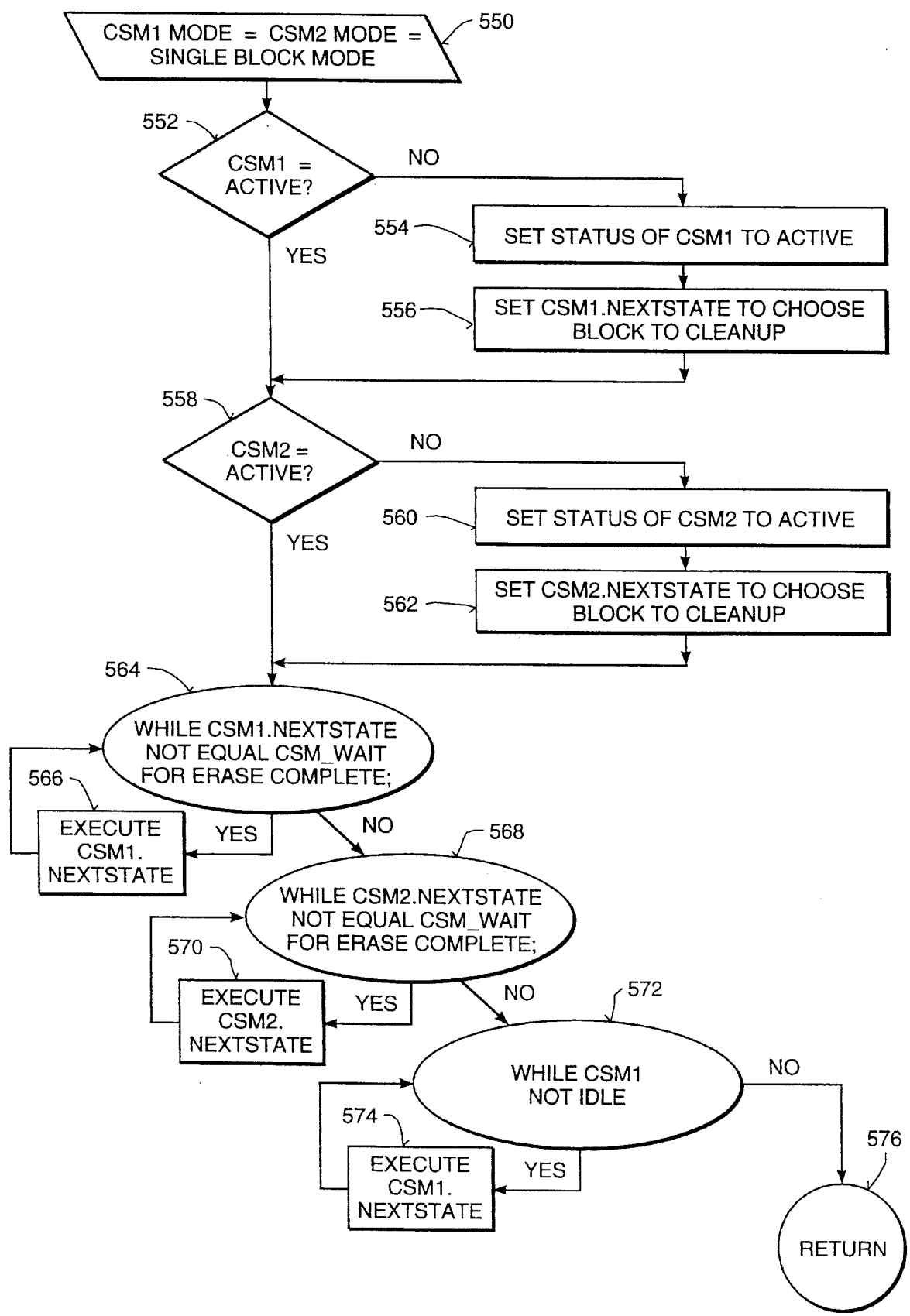
FIG_29 "FOREGROUND CLEANUP"

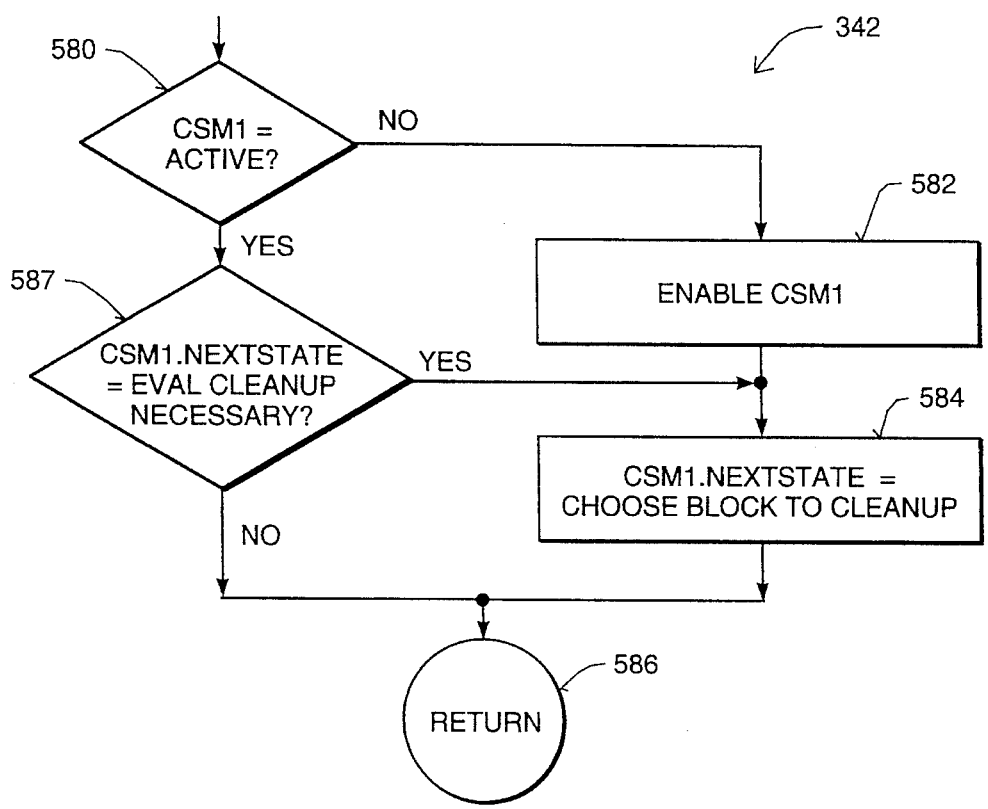
FIG_30 "FORCE CLEAN-UP"
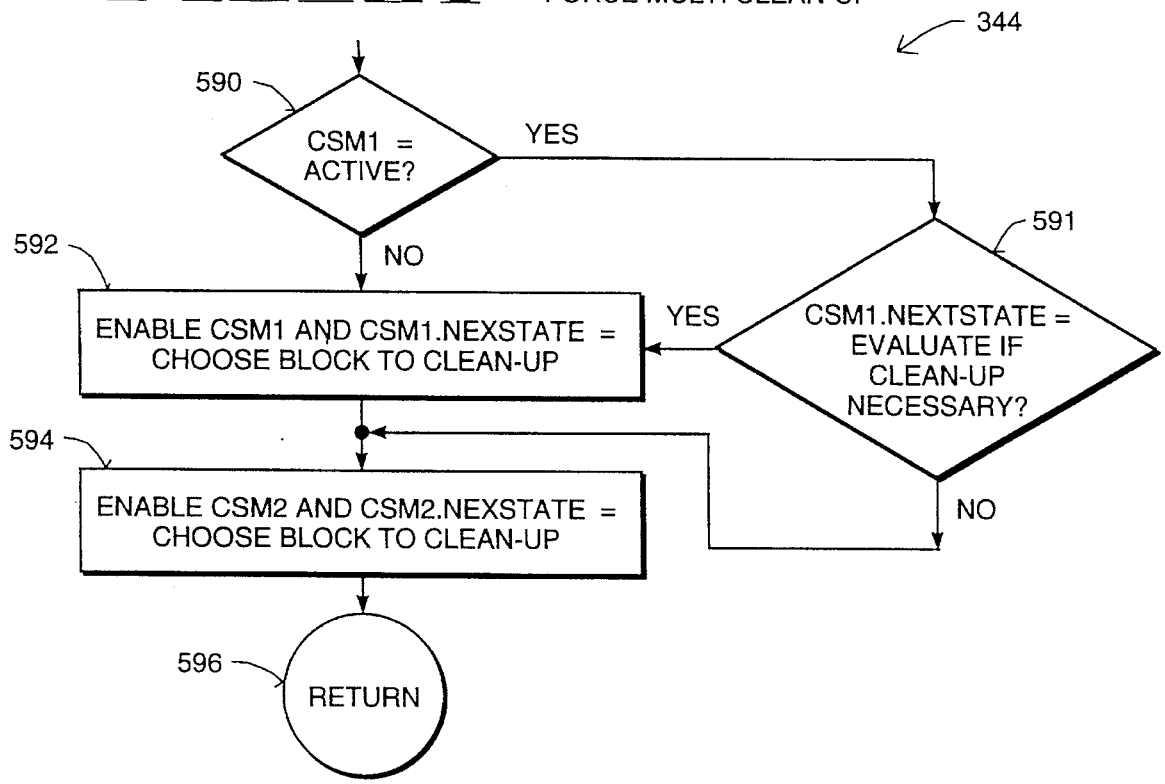
FIG_31 "FORCE MULTI CLEAN-UP"

METHOD FOR ALLOCATING MEMORY IN A SOLID STATE MEMORY DISK

This is a continuation of application Ser. No. 07/969,138, filed Oct. 30, 1992 now abandoned.

FIELD OF THE INVENTION

The present invention pertains to the field of computer storage systems. More particularly, the present invention pertains to a method for allocating free physical memory in a solid state memory disk.

BACKGROUND OF THE INVENTION

Most prior personal computers include many types of memory storage devices. Hard magnetic disk drives are used typically for mass storage, while different types of semiconductor memories are used for other purposes.

The non-volatility of hard magnetic disk drives is one of the chief reasons for their use. They may be turned on and off without loss of data. Hard drives store data on concentric tracks. Each track includes several sectors, each of which is typically 512 bytes in length. Reads and writes to magnetic disk drives occur one bit at a time.

A typical user file stored on a magnetic disk drive occupies many sectors, randomly located on the surface of the disk drive. A file allocation table (FAT) allows location of each sector of the file by storing a chain of pointers for the file. Each pointer points to the next sector of the file.

Hard drives suffer from a number of disadvantages. Their size, their height in particular, often makes them unattractive for use in portable and lap top computers. The height of a hard disk drive has often been a limiting factor in attempts to reduce computer size to make computers more portable. Hard drives also consume relatively large amounts of power, which makes them even less attractive for computers that are battery powered.

Hard drives are less than ideal for use in computers that will be used out-of-doors. Magnetic disk drives are extremely sensitivity to vibration and shock. Additionally, magnetic drives do not tolerate well the dust and humidity of associated with much of the great outdoors.

Semiconductor memories, also referred to as solid state memories, do not suffer from many of the disadvantages of magnetic disk drives. They are small and rugged and consume significantly less power than magnetic drives.

One type of non-volatile semiconductor memory is the FLASH electrically erasable programmable read only memory (FLASH memory). FLASH memories can be programmed by the user and once programmed retain their data until erased. FLASH memories are erased by erasing a block of memory at a time. A block is a relatively large amount of data, 64 Kbytes or 65,535 bytes.

A FLASH memory cell is erased when the net charge on the floating gate is neutral. An erased FLASH bit is referred to as a "1." Conversely, a FLASH memory cell is programmed when the net charge on the floating gate is negative. A programmed FLASH bit is referred to as a "0." A FLASH memory cell cannot be reprogrammed without a prior erasure with one exception. Any FLASH bit can be programmed to a 0 at any time.

In some prior FLASH memories the programming and erasure is controlled internally by a write state machine or a command register. Internal control of programming and erasure lessens the knowledge and time required to program and erase the FLASH memories. However, FLASH erase times remain relatively slow despite internal control. Erase cycle time is on the order one to two seconds. If an erase must occur before every write or re-write of a sector of data it is not possible to approach magnetic disk drive write times using FLASH memory.

SUMMARY OF THE INVENTION

A method of allocating free physical memory in a solid state memory disk for a sector of data of a given size is described. Allocation begins by first determining whether sufficient free memory remains in the block to which the last sector was written to. If there is not, then the amount of free physical memory in each block of the solid state memory disk is determined. Afterward, the block with the greatest amount of free physical memory is selected. Sufficient free memory to store the sector of data is reserved in the selected block, provided the amount of free memory within the selected block exceeds the given size of the sector of data.

A method of allocating free physical memory for sectors of user data stored within a block that is the focus of clean-up is also described. Allocation begins by first determining whether sufficient free memory remains in the block to which the last sector was written to. If there is not, then the amount of free physical memory necessary to store all of the user data remaining within the focus block is determined. Next, a block by block examination of each block within the solid state memory disk begins. First, the amount of free physical memory remaining in a current block after storing a given sector of user data is determined. Second, if the amount of free physical memory remaining is less than a best fit score, then the best fit score is set to the amount of free physical memory remaining in the current block. A best fit block is also revised so that it points to the current block. After every block has been examined and the best fit block selected, sufficient free physical memory to store the given sector of user data is reserved within the best fit block.

Other objects, features, and advantages of the present invention will be apparent from the accompanying drawings and the detailed description that follows.

BRIEF DESCRIPTION OF THE FIGURES

The present invention is illustrated by way of example and not limitation in the figures of the accompanying drawings in which references indicate similar elements and in which:

FIG. 1 is a block diagram of a personal computer including a solid state memory disk.

FIG. 2 is a block diagram of a solid state memory disk.

FIG. 3 is a block diagram of a block file structure.

FIG. 4 is a block diagram of one embodiment of the sector header translation table.

FIG. 5 is a flow diagram of an algorithm for building a sector header translation table upon power-up.

FIG. 6 is an object diagram of the algorithms of the solid state disk controller.

FIG. 7 is a flow diagram for a disk read.

FIG. 8 is a flow diagram for seeking a sector of data using a block sector translation table.

FIG. 9 is a flow diagram for writing a sector.

FIGS. 10A and 10B illustrate a flow diagram of a first method of allocating memory space within the FLASH array.

FIG. 11 is a diagram of block chains.

FIGS. 12A and 12B illustrate a flow diagram of a method of allocating memory space in response to a write command.

FIG. 13 is a flow diagram of a mark dirty algorithm.

FIG. 14 is a block diagram of the various services within clean-up.

FIG. 15 is a flow diagram for enabling a clean-up state machine.

FIG. 16 is a flow diagram for executing one state of a clean-up state machine.

FIG. 17 is a flow diagram of the states of a clean-up state machine.

FIG. 18 is a flow diagram of the algorithm for evaluating whether clean-up should be triggered.

FIG. 19 is a flow diagram of the algorithm for adaptively triggering clean-up.

FIG. 20 is a flow diagram of the algorithm for choosing a block to clean-up.

FIG. 21 is a flow diagram for allocating memory for clean-up.

FIG. 22 is a flow diagram of a method of allocating free physical memory for clean-up.

FIG. 23 is a flow diagram for copying a sector into the sector buffer.

FIG. 24 is a flow diagram for copying part of a sector out of the sector buffer and into a destination block.

FIG. 25 is a flow diagram for updating databases after copying a sector.

FIG. 26 is a flow diagram for initiating erasure of a block.

FIG. 27 is a flow diagram for determining whether erasure of a block is complete.

FIG. 28 is a flow diagram for updating databases after block erasure.

FIG. 29 is a flow diagram for foreground clean-up.

FIG. 30 is a flow diagram for forcing clean-up.

FIG. 31 is a flow diagram of another way of forcing clean-up.

DETAILED DESCRIPTION

I. Overview of Solid State Disk

FIG. 1 illustrates in block diagram form personal computer 50. Personal computer 50 includes central processing unit (CPU) 52 and monitor 54 for visually displaying information to a computer user. Keyboard 56 allows the computer user to input data to CPU 52. By moving mouse 58 the computer user moves a pointer displayed on monitor 54. Personal computer 50 uses solid state memory disk 60 of the present invention for mass memory storage, rather than a hard magnetic disk. Solid state disk 60 includes a solid state disk controller to control nonvolatile semiconductor memory array 62. Nonvolatile semiconductor memory array 62 is also referred to as FLASH array 62.

Sector data associated with a sector number is not stored at a fixed physical location within FLASH array 62. The present invention provides methods of allocating free physical memory within FLASH array 62. According to one method, a block is selected to allocate into if it includes the greatest amount of free physical memory as compared to other blocks within FLASH array 62. According to a second method, a block is selected to allocate a sector of data into according to whether the block is the best fit for a set of sectors of data.

A. FLASH Array and Block File Structure

A greater understanding of solid state disk controller 64 is aided by an understanding of the object of its control, FLASH array 62. The program and erase characteristics of FLASH array 62 strongly influence solid state disk controller 64. The FLASH devices within FLASH array 62 must be erased a block at a time, but can be programmed a byte at a time. Once programmed to a 0, a bit of FLASH memory cannot be programmed to a 1 without first erasing an entire block. Erased bytes of memory are referred to as "free" because they are ready to be written.

Erasure of FLASH memory is a slow process. Performing an erase each time a sector of data is written is impractical. Writes would be slow and power consumption inefficient because an entire block, 128 Kbytes, would have to be erased just to write one sector, 512 bytes. To allow rapid sector writes, solid state disk controller 64 writes each sector of data to a new, free location each time a sector is written. A result of this write method is that there may be several versions of the sector data associated with a single sector number. The most recent version of the sector data is referred to as a "good sector," "valid sector" or a "user sector." In contrast, the earlier version of the sector is invalid and will be marked as "dirty."

The actual amount of FLASH memory within FLASH array 62 cannot greatly exceed the amount stated as available to the user because FLASH memory is relatively expensive. Stated another way, when the amount of reserve memory within FLASH array 62 is lean dirty sectors must be converted into free memory to ensure the availability of memory for writes.

FIG. 2 illustrates in block diagram form FLASH array 62 and solid state disk controller 64. In one embodiment, FLASH array 62 uses thirty 1 megabyte, by 8, FLASH memory chips. These FLASH memories include a write state machine for automatically controlling erasure and programming. These thirty FLASH memory devices function as a 40 megabyte memory disk when data compression is used. Each FLASH chip inputs and outputs data 8 bits at a time. To permit word-wide input and output, FLASH array 62 is organized as pairs of FLASH devices, only one chip pair 66 of which is shown. High chip 68 of chip pair 66 stores the high byte of a word, while low chip 70 stores the lower byte of a word. Solid state disk controller 64 is thus able to treat each chip pair as a single 16 bit-wide memory device. Word-wide input and output gives solid state disk 60 a speed advantage compared to magnetic drives, which use serial bit stream I/O.

Each chip pair is organized as 16 blocks, each block including 128 Kbytes of memory. Because each block of memory can store many sectors of data, each block includes a block sector translation table (BSTT) 84, as illustrated in FIG. 3, to identify and locate each sector of data.

FIG. 3 illustrates block 80 and the file structure used by it and all other blocks. Block 80 is represented as a single word wide structure but is actually stored in two FLASH chips. The high byte of each word is stored in high chip 68 and the low byte of each word is stored in low chip 70.

The data structure of block 80 includes block sector translation table 84 and data space 86. Block sector translation table 84 stores headers. A header is a block of information about one logical sector number and its associated data. As used herein a logical sector number (LSN) refers to a sector number stored within a BSTT. A sector number is a sector identifier received from CPU 52, which the CPU believes corresponds to a fixed physical location. However, as a result of the write policy used by solid state disk 60, an LSN does not correspond to a fixed physical location. Also as a result of the write policy used, several headers and LSNs may correspond to a single sector number.

In one embodiment, each logical sector number is 24 bits long.

A header is created for each and every sector number during disk formatting. This allows the loss of sectors of data to be detected during the execution of read and write commands. Failure to find the header associated with a particular sector number indicates that the associated sector of data has been lost. As used herein "lost" refers to a sector of data that disappears because of a defect in FLASH 62 array or to a sector of data that is unreliable because it has been corrupted.

Each header 85 includes a cyclical redundancy check (CRC), which allows solid state disk 60 to determine the reliability of header 85.

Header 85 also includes an attribute word that contains a great deal of information about the sector data associated with the header. One bit of the attribute word indicates whether the sector number has been marked as part of a bad track. Another bit indicates whether or not the sector data has been compressed. The attribute word includes two dirty bits for reliability. The sector data associated with the header is considered valid if both dirty bits are set and dirty if either dirty bit is reset. The attribute word also includes a data attached bit. When no sector data is attached to the header, the data attached bit is reset. This is the case for all headers after formatting. Once data is written for the sector number, the data attached bit is set. The final piece of information included in the attribute word is a revision number. The revision number allows solid state controller 64 to identify the valid header when multiple valid headers with the same LSN exist.

The last piece of information stored in header 85 is a block sector offset (BSO). The BSO is an offset from the top of the block to the start of FLASH memory space associated with the header. Memory space is allocated to a header whether or not data is stored in that space. If data is not attached to the header, then the amount of memory allocated is the size of data space 86 divided by the maximum number of headers in BSTT 84.

Memory space must be allocated to headers that do not have sector data attached. This is because during formatting entire BSTTs 84 are filled with headers that have no data attached. Even though all of data space 86 associated with these BSTTs 84 is free, data space 86 cannot be written to. There is simply no room in the BSTTs of these blocks. To avoid a Catch 22 situation in which free memory is not available for allocation, all of data space 86 associated with these BSTTs 84 is categorized as user data. In other words, the sector is neither dirty, as indicated by dirty bits, nor free. By allocating memory data space 86 to headers with unattached data and by subtracting that amount of memory from the amount of free memory in the appropriate block, appropriate chip pair, and array, part of data space 86 is designated as user data. As sectors of data are written after formatting, the headers without attached data will be marked dirty, along with their allocated data space. Eventually, blocks filled up during formatting will be cleaned-up and their data space made available as free memory.

It is crucial that headers can be written without data attached when data compression is not used. Few reserves are available for clean-up when data compression is not used and every possible sector of data is written to solid state disk 60. In this situation, clean-up efficiency is seriously impaired, and data fragmentation is likely. Data fragmentation, in turn, leads to many foreground clean-ups, degrading overall solid state disk performance.

Because data for one sector is butted up against data for another sector in data space 86, each BSO indicates the top of data for one sector and the bottom of data for another sector. For example, the block offset for sector 1, $BSO_1$, points to the start of the data associated with $LSN_1$. $BSO_1$ also points to the bottom of data associated with $LSN_2$. Another way of looking at block sector translation table 84 is that each LSN is sandwiched between two block sector offsets, one pointing to the top of the sector data and the other pointing to the bottom of the sector data. The bottom of the data associated with the sector stored at the bottom of the block, $LSN_1$, need not be indicated by a BSO as the location of the bottom of the block is known.

Block sector translation table 84 grows down toward data space 86. The first header BSTT 84 is written at the top of block 80. The header for each succeeding sector written into block 80 is stored below the previous header.

In contrast to BSTT 84, data space 86 grows upward. The first sector of data written into block 80 is written into the bottom of data space 86. The next sector of data written into data space 86 is written immediately above the previous sector. For example, the data associated with $LSN_2$ is located within a lower range of addresses than the data associated with $LSN_1$.

The number of sectors that may be stored in data space 86 before it runs into BSTT 84 varies. This variability arises when sector data is compressed, which causes sector size to vary. With data compression, sector size may vary between 256 words to just a few words. A maximum of 2047 sectors may be stored in data space 86 given the seek strategy used by solid state disk 60.

Solid state disk controller 64 prevents BSTT 84 and data space 86 from crashing into each other as they grow. In fact, solid state disk controller 64 ensures that some slack 88 is maintained between BSTT 84 and data space 86. Slack 88 is free FLASH memory, which has not been programmed. According to the conventions of FLASH memory, a free memory location stores FFFF (hexadecimal). During seeks of block sector translation table 84, slack 88 indicates that the end of BSTT 84 has been reached.

Block 80 also stores block attribute data 90. Information specific to the block is stored attribute data 90. For example, block attribute data 90 includes cycle count, which indicates the number of times the block has been erased and written to. Block attribute data 90 may also include block defect information.

B. Overview of the Solid State Controller Hardware

Referring once again to FIG. 2, reading, writing, and clean-up of FLASH array 62 is controlled by solid state disk controller 64. Microprocessor 92 manages these tasks using database 93, sector header translation table (SHTT) 94 and the algorithms of the present invention, which are stored in FLASH memory 95. Databases 93, SHTT 94, and algorithms will be described in greater detail below. An application specific integrated circuit, window ASIC 96, serves as a window to the outside world for microprocessor 92 as well as windows into the FLASH array 62. Via window ASIC 96, microprocessor 92 receives commands from CPU 52 and reads and writes to FLASH array 62. Window ASIC 96 includes four windows, allowing microprocessor 92 to repeatedly and rapidly access a number of FLASH memory locations. Thus, window ASIC 96 increases the addressable memory space of microprocessor 92. Data to and from CPU 52 flows through window ASIC 96 to sector buffer 98. Sector buffer 98 allows data transfers to CPU 52 to occur more rapidly than possible otherwise. Solid state disk controller 64 includes charge pump 100. Charge pump 100 converts 5 volts into the 12-volt level needed for programming and erasure. Charge pump 100 is not necessary unless the voltage levels supplied to solid state disk 60 are all below the 12-volt voltage level necessary to program the FLASH devices within FLASH array 62.

C. FLASH Array Database and Sector Header Translation Table

Performance of solid state disk 60 is enhanced by storing repeatedly used information in random access memory (RAM). This information is referred to as FLASH array database 93 because it generally relates to current characteristics of FLASH array 62. Information within FLASH array database 93 includes:

1. The total number of dirty words within FLASH array 62 (TDFA);
2. The total number of dirty words in each block (TDFB$_N$);
3. The total number of free words within FLASH array 62 (TFFA);
4. The number of free words within each chip pair (TFFC$_M$); and
5. The total number of free words within each block (TFFB$_N$).

The use of FLASH array database 93 by solid state disk controller 64 will be described below on an algorithm by algorithm basis.

Sector header translation table (SHTT) 94 translates a sector number into a pointer to an associated sector of data. To permit its frequent and easy modification, SHTT 94 is preferably stored in RAM. The pointer supplied by sector header translation table 94 does not point directly to the data associated with the given sector number. Rather, the pointer supplied by SHTT 94 points to a location within BSTT 84 near the header associated with the sector number.

The reason why SHTT 94 does not point directly to the header associated with the sector number can be understood by examining the number of bits necessary to uniquely address each possible header in a BSTT 84. A maximum of 2047 headers may be stored in a BSTT 84. Given 15 chip pairs, each including 16 blocks in a chip pair, FLASH array 62 could store as many as 491,280 headers. Uniquely identifying that many headers requires 19 bits. Storing 19 bits requires using three by 8 RAM chips. Thus, 5 of 8 bits in one RAM would be wasted to store three bits. This is an expensive and unacceptable solution in the effort to produce a price competitive solid state memory disk.

A number of SHTT designs solve this 19 bit dilemma. One embodiment, shown in FIG. 4, stores a pointer for every one of the possible 83,300 sectors numbers of data of an industry standard 40 MB disk drive. Only 16 bits are stored for each entry in SHTT 94. Four of the bits indicate the chip pair in which the sector data being sought is stored. Another four bits indicate the particular block in which the sector is stored. The remaining 8 bits represent an offset from the top of the block to a header which is near the desired header. This offset is called a header pointer. Using 8 bits to represent the header pointer means that there are 256 header pointers available to locate a maximum of 2047 headers. Consequently, a maximum of 8 headers must be scanned in BSTT 84 to locate the desired header. Stated another way, SHTT 94 requires a two tiered search to locate the data associated with a particular sector number. First, SHTT 94 is searched to locate a particular chip, block and header pointer. Second, the indicated area of BSTT 84 is searched to find the header associated with the sector number.

SHTT 94 of FIG. 4 stores a physical address for each sector stored on solid state disk 60. The number of entries in SHTT 94 can be reduced by using a most recently used cache memory.

Both FLASH array database 93 and SHTT 94 must be generated during power-up because they are stored in volatile memory, RAM, and because reads and writes depend upon 93 and 94. FIG. 5 illustrates an algorithm to build both FLASH array database 93 and SHTT 94. Using this algorithm both SHTT 94 and the FLASH array database 93 are generated by scanning each BSTT 84. The location of the header associated with each sector number is noted, as well as the amount of free and dirty memory within the block.

Building begins in step 110 with the initialization of SHTT 94. Each pointer for each sector number is set to the same initial value. In one embodiment, that value is FFFF (hexadecimal). As a result, after building SHTT 94 retrieving a pointer equal to the initial value indicates that the sector of data associated with the sector number has been lost because during formatting a header is created for each sector number. Microprocessor 92 branches from step 110 to step 111.

In step 111 total amount of free memory within FLASH array, TFFA, and the total amount of free memory per chip, TFFC$_M$, are initialized to their maximum values. The maximum free FLASH per chip is 64 Kbyte/block * 16 blocks, or 2048 Kbyte per chip pair minus the block attribute data stored in each block. Similarly, TFFA$_{max}$ is 2048 Kbyte per chip pair * 15 chip pairs, or approximately 30 Mbyte. This done, microprocessor 92 branches to step 112 to begin scanning BSTTs 84.

In step 112 microprocessor 92 determines whether any block within FLASH array 62 remains to be scanned. If so, microprocessor 92 proceeds to step 114 and selects a block to scan, B$_C$. From step 114, microprocessor 92 branches to step 115. There the total amount of free memory in the current block, TFFB$_C$, is initialized to its maximum. Microprocessor 92 then proceeds to step 116.

In step 116, microprocessor 92 reads the next header from the selected block's block sector translation table 84. Afterward, microprocessor 92 branches to step 118.

Microprocessor 92 begins to classify the current header in step 118. Microprocessor 92 determines whether the header has been marked dirty by reading the dirty bits included in the attribute word of the current header. If either dirty bit is a logical zero, the data associated with the LSN is considered dirty. If the sector of data is dirty, then microprocessor 92 branches to step 120 to update FLASH array database 93.

In step 120, microprocessor 92 determines the size of the dirty sector, which may vary as a result of data compression. Sector size is determined by comparing the block sector offsets on either side of the current LSN. After determining the size of the dirty sector, microprocessor 92 updates TDFA and TDFB$_C$. The total number of dirty words, TDFA, and the total number of dirty words within the current block, $TDFB_C$, are increased by the size of the sector and its header. Afterward, microprocessor 92 advances to step 121.

Microprocessor 92 appropriately revises its FLASH free variables. The size of the current sector and its header are subtracted from TFFA, $TFFB_C$ and $TFFC_C$. Afterward, microprocessor returns to the building of FLASH array database 93 and SHTT 94 by branching back to step 116.

On the other hand, if the sector is not dirty microprocessor 92 branches from step 118 to step 122. Microprocessor 92 then examines the attribute word within the current header to determine if the end of the BSTT 84 has been reached. If the attribute word for the next header is FFFF (hexadecimal), the end has been reached. In this case, microprocessor 92 branches back to step 112 to determine whether scanning of BSTTs 84 should continue. In all other cases, microprocessor 92 advances to step 124 from step 122.

Entry into step 124 means that the current header is associated with a valid sector of user data. Accordingly, microprocessor 92 reduces free variables TFFA, $TFFB_C$ and $TFFC_C$ by the size of the current sector. (The subscript "C" designates "current.") This done, microprocessor 92 advances to step 126.

In step 126, revision of the SHTT entry for the current header begins by seeking an entry in SHTT 94 for the sector number equal to the LSN included in the current header. If the current entry in the SHTT is FFFF (hexadecimal), no information exists for the sector number. Microprocessor 92 responds to this situation by branching to step 128. Any entry other than FFFF for the sector number means that there are two versions of the data for that sector number. To sort things out, microprocessor 92 advances to step 130.

Consider first the simpler situation; that is, when no data is stored in SHTT 94 for the sector number corresponding to the current LSN. In step 128, microprocessor 92 writes the chip pair, block and header pointer for the current header into SHTT 94. This done, microprocessor 92 branches back to step 116 to examine another header.

Things are more complicated when SHTT 94 already includes an entry for the sector number associated with the current LSN. In step 130, the microprocessor determines which header and thus which sector of data is most current by comparing their revision numbers. In step 132, microprocessor 92 then marks dirty the earlier, invalid, sector of data by programming the dirty bits in its header to a logical 0.

In step 133, the microprocessor updates database 93 to reflect the total number of dirty words for the block including the sector just marked dirty and the total number of dirty words for FLASH array 62. The update is accomplished by adding the sector size to $TDFB_C$ and TDFA.

SHTT 94 is finally updated, if necessary, in step 134. No update is necessary if the header and LSN selected in step 116 were marked dirty in step 132. Otherwise, the chip pair, block and header pointer for the LSN selected in step 116 are written into SHTT 94.

From step 134, microprocessor 92 returns to step 116. There another header is selected.

After every header within FLASH array 62 has been scanned, building of SHTT 94 is complete. If a header has not been located which corresponds to a sector number, the pointer within SHTT 94 remains at its initial value. Thus, the pointer indicates that the sector of data has been lost and every sector of data is accounted for by SHTT 94.

II. Solid State Disk Controller

The heart of solid state disk controller 64 is the set of algorithms stored within FLASH memory 95. These algorithms control the reading, writing, and cleaning-up of FLASH array 62. These algorithms help create the illusion that CPU 52 is dealing with an industry-standard hard magnetic disk drive.

The object diagram of FIG. 6 illustrates the general organization and interrelationship of algorithms used by solid state controller 64. The algorithms of solid state disk controller 64 are organized into three classes: top level scheduler 150, host interface 152, and FLASH media 154. Top level scheduler 150 handles the allocation of microprocessor 92 processing time between the other two classes 152 and 154. Host interface 152 interprets industry standard disk drive commands from CPU 52 and translates them into commands that FLASH media 154 can act upon. FLASH media 154 interfaces directly with FLASH array 62, responding to read and write requests from host interface 152. FLASH media 154 also manages the cleaning-up of FLASH array 62.

The scheduling of host interface 152 and FLASH media 154 is a relatively simple task. Power-up of solid state disk 60 fires top level scheduler 150. It initializes the solid state disk 60 and then calls host interface 152. This allocates to CPU 52 all the resources of solid state disk 60. When host interface 152 returns control to top level scheduler 150, clean-up object 164 is called. If a clean-up is on-going, then a slice of microprocessor 92 execution time, 500 μ seconds in one embodiment, is allocated for clean-up. When clean-up returns control to top level scheduler 150, host interface 152 is called again. Top level scheduler 150 repeats the process again and again for as long as solid state disk 60 is powered up.

Host interface 152 includes two classes of algorithms, interface 156 and sector buffer 158. Interface 156 emulates an AT-IDE hard disk interface. Interface 156 handles ATA command interrupts and translates ATA commands into commands comprehensible by FLASH media 154. In alternate embodiments, host interface 156 may simulate a SCSI disk interface or other standard disk drive interface. Sector buffer 158 manages the usage of sector buffer 98.

Briefly described, FLASH media 154 includes five types of algorithms, or services: disk 160, sectors 162, clean-up 164, FLASH power 166 and FLASH array interface 167. Disk 160 services read and write requests from interface 156. Disk 160 also translates other commands from interface 156 and delegates them for execution to fellow classes 162, 164, 166 and 167. Sectors 162 is responsible for most tasks relating to sectors stored within FLASH array 62. Sectors 162 maintains FLASH array database 93 used by both disk 160 and clean-up 164, as well as allocating free memory space within FLASH array 62. Sectors 162 also controls the reading of data from FLASH array 62 via FLASH array interface 167 and sequencer 168. FLASH power 166 is essentially a device driver; that is, it generates the voltage levels necessary to read or write to FLASH array 62. FLASH array interface 167 handles the low level routines which directly control the reading and writing of FLASH array 62. Sequencer 168 handles the movement of data between sector buffer 98 and FLASH array 62. Just as its name implies, clean-up 164 manages the clean-up of FLASH array 62. FLASH power 166 manages the limited current budget of solid state disk 60, which in one embodiment is only 120 mA. Given that erasing a block in a chip pair requires up to 60 mA efficient management of current is a concern.

A. Reading a Sector from FLASH Array 62

Briefly described, reading a sector is a three step process. First, SHTT 94 is searched for a pointer to the header associated with the sector number. Second, the header is located and its attribute word is examined to see if the attached data is valid. Third, if the sector data associated with header is valid, its location is determined and returned to CPU 52.

A read algorithm implemented by disk 160 is illustrated in the flow diagram of FIG. 7. All callers input a sector number.

The first task of microprocessor 92 in step 170 is examination of the input sector number for validity. The maximum number of sectors within an industry standard disk drive determines whether a sector number is valid. For example, a standard 40 MB drive includes 83,300 sectors. Thus, any sector number greater than 83,300 would be invalid in a 40 MB drive.

Microprocessor 92 branches from step 170 to step 172 if the calling program passed in an invalid sector number. Microprocessor 92 indicates the invalidity of the sector number to the caller by setting a status word to invalid sector number range. Microprocessor 92 then branches to step 174, returning control to the caller.

On the other hand, microprocessor 92 proceeds to step 176 from step 170 if the caller has requested to read a sector with a valid sector number. In step 176, microprocessor 92 takes the sector number and searches SHTT 94 for the chip, block and header pointer associated with the sector number.

Microprocessor 92 determines in step 178 whether data exists for the sector number requested. Microprocessor 92 may be able to tell whether a header exists for a particular sector number by examining the header pointer retrieved from SHTT 94. If the header pointer is FFFF (hexadecimal), a valid header cannot be found for the sector number, even though a header is created for every sector number during formatting.

Microprocessor 92 responds to a lost sector by branching to step 180 from step 178. There microprocessor 92 indicates that the header was not found. Microprocessor 92 then branches to step 174, the read complete.

On the other hand, if a header exists for the sector number then microprocessor 92 branches to step 182. There sectors 162 seeks for the header associated with the input sector number. If the desired header is located, sectors 162 indicates the chip pair, block, and offset to that header. Sectors 162 also indicates if the desired header cannot be found.

Once sectors 162 returns from its seek, microprocessor 92 branches to step 184 to determine the success of the seek. If the seek algorithm did not locate the header associated with the sector number, microprocessor 92 branches to step 180 to so inform the caller. On the other hand, if the appropriate header was located microprocessor 92 branches to step 186. There the information retrieved in step 182 is passed to the read service of sectors object 162. The data associated with the sector number will be copied into sector buffer 98 and provided to host CPU 52. Afterward, the read complete, microprocessor 92 returns control to the caller by branching to step 174.

FIG. 8 illustrates a method of seeking sector data given a sector number. This algorithm also is implemented by sectors 162.

Briefly described, the seek algorithm of FIG. 8 has two approaches to locate the data associated with a sector number. The first approach relies upon data coherency to decrease seek time. That is, it is assumed that the sector of data being currently sought is related to, and located near, the last sector of data located. If this approach fails to locate the desired sector of data, then a two tiered approach is used.

First, SHTT 94 is searched to locate a chip pair, block, and a header offset for the sector number input, $SN_i$. Then, using that information, a BSTT 84 is searched for a header with an LSN equal to the sector number input by the caller.

Location of the sector of data begins in step 190. There microprocessor 92 determines whether another header is stored in the last BSTT 84 searched. If so, it is possible that the header associated with the input sector number resides within the same BSTT 84. In that case, microprocessor 92 advances to step 192. However, if the last header located was the last header located within its BSTT 84, then it is not possible to quickly locate the sector of data associated with the input sector number. A two tiered search must be used. Microprocessor 92 advances to step 206 in that case to begin that two tiered search.

Consider first, the actions of microprocessor 92 upon entry to step 192. Microprocessor 92 reads the header immediately following the last header located. Let us designate the LSN in this header "$LSN_{L+i}$." $LSN_{L+i}$ is compared to $SN_i$ in step 194 to determine if the current header is the desired header. If $LSN_{L+1}$ does not equal $SN_i$ then the sector of data must be located another way. In that case, microprocessor 92 advances to step 206. On the other hand if $LSN_{L+1}$ does equal $SN_i$ then microprocessor 92 branches to step 196.

With step 196 the process of determining the reliability of the current header begins. During step 196 microprocessor 92 generates a cyclical redundancy check (CRC) for the current header. Let us call this CRC "$CRC_G$." In step 198 $CRC_G$ is compared to the CRC stored in the header itself, $CRC_{stored}$. The information within the current header is considered reliable when $CRC_G=CRC_{stored}$. Microprocessor 92 responds to this condition by branching to step 200. On the other hand, if the current header is not reliable because $CRC_G$ does not equal $CRC_{stored}$ then microprocessor 92 proceeds to step 206.

Consider first the actions of microprocessor 92 when the desired header has been located. Microprocessor 92 first determines the size of the sector of data associated with the header in step 200. This is done using the appropriate block sector offsets, as previously discussed. The sector size, chip pair, block, and offset to the desired header are returned to the caller in step 202.

When it is successful, the method of steps 190–202 reduces the time required to locate a sector of data by a factor of four as compared to the two-tiered search of steps 206–222.

The two-tiered search begins with step 206 after the quicker approach has failed. Microprocessor 92 performs the first level of search by seeking SHTT 94 for the chip pair, block, and header pointer associated with the sector number input $SN_i$. The values for the chip pair, block, and header pointer retrieved in step 206 are examined in step 208 to determine whether a header can possibly be located for $SN_i$. If the values are equal to the initial value, then the header associated with $SN_i$ has been lost. In one embodiment the initial, invalid values are FFFF (hexadecimal). Microprocessor 92 responds to invalid chip pair, block, and header pointer values by branching to step 224. There the caller is informed that the header associated with the input sector number was not found. On the other hand, if the values retrieved from SHTT 94 are valid, microprocessor 92 advances to step 210.

The second tier of the seek begins in step 210 by initializing a scan count to zero. The scan count tracks the number of headers examined during the seek. Microprocessor 92 then reads the header near the header pointer.

From step 210, microprocessor 92 advances to step 212 to compare the current scan count to the maximum scan count.

The maximum number of headers that must be scanned is set by dividing the maximum number of headers in a BSTT 84 by the maximum number of header pointers. For example, in one embodiment of solid state disk 60, a maximum of 2047 headers are stored in BSTT 84 and only 256 header pointers are used. Thus, a maximum of 8 headers must be scanned in this embodiment. If the scan count is less than the maximum, microprocessor 92 branches to step 214 to continue the search for the desired header. On the other hand, once the scan count equals the maximum, microprocessor 92 advances to step 224 from 212.

Consider first the situation when the scan count is less than the maximum. Microprocessor 92 enters step 214 where it compares the LSN stored in the current header to the input sector number. There microprocessor 92 determines whether the current header is the one sought by comparing the sector number input, $SN_i$, to the LSN stored in the block. If $LSN=SN_i$, microprocessor 92 advances to step 216. If the two are equal the desired header may have been located. Otherwise, the search for the desired sector must continue.

The search of the desired sector continues in step 222 by incrementing the scan counter and reading another header located beneath the last header. Microprocessor 92 then returns to step 212 to determine whether this new header is the desired header.

When an LSN is equal to the input sector number, microprocessor 92 advances to step 216 from step 214. In step 216 a cyclical redundancy check, $CRC_G$, is generated for the current header. $CRC_G$ is used in step 218 to assess the reliability of the information included in the header.

In step 218 reliability of the header is determined by comparing $CRC_G$ to the CRC stored in the selected header. The information within the header cannot be relied upon unless the two CRCs are equal.

Microprocessor 92 branches to step 220 from step 218 if the current header is not reliable. Because the block sector offset within the current header cannot be relied upon, two sectors of data are lost. For example, assume that the header being scanned was the header for $LSN_1$, illustrated in FIG. 3. Because $BSO_1$ cannot be relied upon, neither the start of data for $LSN_1$, nor the end of data for $LSN_2$ can be determined. Thus, in step 220 microprocessor 92 discards two sectors of data by marking dirty both the selected header and the header immediately beneath it. Microprocessor 92 then advances to step 222.

If the current header can be relied upon, microprocessor 92 advances to step 200 from 218. Having reached step 200, microprocessor 92 begins gathering the information needed to read the sector data. First, the size of the sector is determined by reading the appropriate BSOs. Finally, in step 202 the sector size and attribute word is returned to the caller along with the chip pair, block, and offset to the header. Microprocessor 92 then returns control to the caller in step 204.

B. Writing a Sector to FLASH Array 62

Writing a sector of data involves three major tasks. First, enough free memory to write the sector data must be located and reserved. Second, any previous version of sector data with the same LSN is marked dirty and the sector header translation table 94 is updated. Third, the sector data and its header are written into the appropriate block.

FIG. 9 presents an overview of the process of writing a sector of data into FLASH array 62. A write begins when disk 160 receives a write command accompanied by an input sector number, $SN_i$, from CPU 52. At this point, the data to be written into FLASH array 62 resides within sector buffer 98. A number of outcomes are possible using the algorithm of FIG. 9 depending upon the $LSN_i$ and the data stored in SHTT 94.

Consider first the outcome when $SN_i$ is invalid. The first action of microprocessor 92 upon receipt of the write command is to examine $SN_i$. This is done in step 230. Any $SN_i$ greater than 83,300 or less than 1 will not be written into a 40 MB drive.

Given that the $SN_i$ is invalid, microprocessor 92 branches from step 230 to step 232. There microprocessor 92 sets the status word to inform interface 156 that the sector number received was invalid. That done, microprocessor 92 advances to step 234. Control of microprocessor 92 then returns to the calling program.

Assume now that $SN_i$ is valid, and that its attribute word indicates that the track associated with $SN_i$ has been marked bad. Because $SN_i$ is valid, microprocessor 92 branches to step 236 from step 230.

Preparations to write the sector begin in earnest in step 236. Microprocessor 92 enables charge pump 100, enabling it to develop the 12 volt level necessary to program FLASH memory. Microprocessor 92 then performs other tasks until charge pump 100 reaches 12 volts.

In step 238, microprocessor 92 calls the seek algorithm to locate the chip pair, block, and header pointer for an earlier version of the sector data. After locating the information associated with the sector number, microprocessor 92 branches to step 240.

In step 240, microprocessor 92 determines whether the bad track bit has been set. Microprocessor 92 does so by examining the sector attribute word. Given that the bad track bit has been asserted, microprocessor 92 advances to step 242 from step 240.

Microprocessor 92 will not write the sector data into FLASH array 62 because the track associated with $SN_i$ has been marked bad. In step 242, microprocessor 92 informs interface 156 that the track is bad. Afterward, microprocessor 92 returns control to interface 156 by branching down to step 234.

The previous discussions show that a sector of data will not be written into FLASH array 62 if either $SN_i$ is invalid or its associated track has been marked bad. Stated conversely, sector data will be written into FLASH array 62 if it is associated with a good track and valid $SN_i$. Consider now such a situation. Microprocessor 92 responds by branching from step 240 to step 244.

In step 244, microprocessor 92 continually queries charge pump 100 to determine whether it has reached 12 volts. The amount of time required by charge pump 100 to reach 12 volts cannot be predicted because it varies depending upon how long it has been since charge pump 100 was last enabled. The less time that has passed since charge pump 100 was enabled, the less time required to reach 12 volts again. Once charge pump 100 stabilizes at 12 volts, microprocessor 92 branches to step 246.

In step 246, microprocessor 92 determines whether a previous header with the same LSN should be marked dirty. Microprocessor 92 makes this determination based upon the information retrieved by the seek of step 238. If a header was located, microprocessor 92 proceeds to step 247 to mark that header dirty. Afterward, microprocessor 92 advances to step 248 to determine whether the previous header was marked dirty or whether the task was cached. If the task was not cached, microprocessor 92 advances to 250. Otherwise, microprocessor 92 branches to step 249. Because the mark dirty task was cached, there will be two headers with the same LSN at the end of the current write. To distinguish the valid data after power-loss, the revision number for the LSN associated with the most current version is incremented in step 249. Microprocessor 92 then proceeds to step 250.

With step 250, microprocessor 92 begins the process of writing the new version of the sector data within FLASH array 62. Microprocessor 92 allocates sufficient free memory within FLASH array 62 to store the sector of data and header. This is an involved process that will be described in detail later. Suffice it to say that allocation of memory requires locating sufficient memory within data space 86 of a block and marking that memory space as reserved. Microprocessor 92 then exits to step 252.

Microprocessor 92 completes the writing of the header in steps 252 and 254. First, in step 252, a CRC is generated for the header, which excludes the dirty bits and revision numbers because they may be changed in the course of events. Afterward, in step 254, the CRC, attribute word and LSN are written into BSTT 84. The LSN is set equal to $SN_i$.

Microprocessor 92 finally writes the sector data into data space reserved in step 256. An error correction code, ECC, is also written with the data.

The new version of the sector data safely written, in step 258 microprocessor 92 updates sector header translation table 94 so that it points to the most recent version of the sector data associated with the sector number.

In step 260 microprocessor 92 disables charge pump 100. Turning charge pump 100 off when it is not needed reduces power consumption. This enhances the suitability of solid state disk 60 for use in portable and laptop computers. This done, microprocessor 92 branches to step 262.

During step 262, microprocessor 92 forces an evaluation of whether clean-up is necessary as a result of the write. Microprocessor 92 does this by calling a service named "Enable CSM," which will be described in detail later. This done, microprocessor 92 advances to step 234, returning control to the caller.

C. Allocating Memory Space for a Write

Allocating memory space within FLASH array 62 is a complex and critical task. Not only must memory space be allocated, an appropriate location must be chosen to prevent performance degradation. Choosing a block for a sector write potentially involves four major decisions. First, are there sufficient FLASH memory reserves to allow the write? Second, is there enough free memory in the block to which the current process was last allocated to store the current sector? If the answer to the second question is no, then a third and a fourth question must be asked. Is there a block with enough free FLASH memory to store the sector data? Is that block an appropriate block in which to store this sector?

The fourth decision is a difficult one because whether a block is an appropriate block depends on a number of factors. First, the block chosen cannot be included in a busy chip pair. Waiting on a busy chip pair is avoided because it diminishes the speed with which commands from CPU 52 are obeyed. Second, the block chosen should not be within a block targeted for clean-up. Data written into a block targeted for clean-up will just have to be relocated right away. Third, the block chosen should not be within the same chip pair allocated to another process. This avoids data fragmentation, which eventually results in foreground erase and decrease in power efficiency. Data fragmentation refers to a random distribution of clean, dirty, and free sectors throughout FLASH array 62. Data fragmentation is catastrophic to solid state disk performance when reserves of memory space are lean. By allocating writes initiated by CPU 52 into different blocks than writes initiated by clean-up, dirty sectors are likely to be grouped together. This reduces the number of sectors that must be copied out of a block during clean-up, thereby improving power efficiency and clean-up performance.

FIGS. 10A and 10B illustrate a flow diagram of an algorithm for allocating memory that may be used for host writes or for clean-up. The algorithm shown belongs to sectors 162. Given the size of the sector to be written and the caller type, the allocate algorithm locates and reserves sufficient memory. The reserved location is stored in RAM for future reference by the algorithm.

A number of outcomes are possible using the allocation algorithm of FIGS. 10A and 10B. Consider first the outcome of greatest interest: memory is allocated. Other outcomes will be considered afterward.

Allocation of memory begins at step 271 by determining whether memory has been requested for clean-up or for a host write. If clean-up requires free physical memory microprocessor 92 branches ahead to step 282. On the other hand, when host CPU 52 requests memory microprocessor 92 must decide whether to allow the write in view of available memory reserves. This determination takes place in steps 272 through 280.

Microprocessor 92 begins its determination in step 272 by calculating what the available reserves after writing a sector of the desired size would be. As used here, "reserves" refer to both free and dirty memory within FLASH array 62 and "sector size" includes both the size of the data and the header. The available reserves are then compared to a first warning level, FLASH Warn 1. In one embodiment, FLASH Warn 1 represents 19 blocks of reserves. If the available reserves exceed FLASH Warn 1, microprocessor 92 advances to step 273. There, microprocessor 92 indicates that reserve status is acceptable. Afterward, microprocessor 92 proceeds to step 282. On the other hand, if available reserves will not exceed FLASH Warn 1, microprocessor 92 proceeds to examine the reserves in greater detail. First, however, microprocessor 92 signals that reserves have fallen below the first warning level by setting the reserve status to FLASH Warn 1 in step 274.

In step 275 the available reserves remaining after the write are compared to a second warning level, FLASH Warn 2. In one embodiment, FLASH Warn 2 represents 11 blocks of reserve. Microprocessor 92 branches ahead to step 282 if available reserves after the write exceed this second warning level. Otherwise, microprocessor 92 proceeds to step 276. There the reserve status is reset to indicate reserves have fallen below the second warning level.

Microprocessor 92 reevaluates the available reserves in step 278 by comparing them to a third warning level, standby. In one embodiment, standby represents 2 blocks of reserves. If available reserves will exceed standby after the write, then microprocessor 92 permits the write by branching to step 282. Microprocessor 92 advances to step 279 if available reserves will not exceed standby. There the reserve status is set to standby. As a result, no more writes by CPU 52 will be permitted until sectors are released by host CPU 52. Control is then returned to the caller in step 304 as illustrated in FIG. 10B.

With step 282 microprocessor 92 begins searching for a block with enough free memory in data space 86 to store the sector data to be written. Microprocessor 92 searches for a block using a set of block chains, two of which are illustrated in FIG. 11. Block chain 320, figuratively speaking, chains together block 1 of each chip pair ($CP_M$) within solid state disk 60. Similarly, block chain 322 links together block 15 of each chip pair ($CP_M$). Blocks 2 through 14 are linked together in similar chains, though they are not shown. Chaining blocks together in the fashion shown is not necessary but causes sectors of data to be distributed across chip pair boundaries. This provides passive wearleveling and nearly eliminates the need for active wearleveling.

Microprocessor 92 uses block chains in conjunction with pointers stored in RAM. Microprocessor 92 stores the chip and block last allocated to each caller. The next time the same process attempts to write a sector, the allocation algorithm first examines the last block allocated to that process. This helps keep related data "files" in contiguous memory space and helps reduce the possibility of data fragmentation. As microprocessor 92 searches for a block for each caller, the caller's pointer circles around a block chain. The starting pointer stored in RAM for each caller is different to help avoid data fragmentation. Each pointer moves around the block chains at its own rate. Additionally, each pointer moves from block chain to block chain at a different rate, depending upon the availability of free memory. No two pointers ever point to the same block in any chain.

With this understanding of block chains, return once more to a discussion of the location of a block with enough memory according to the allocation algorithm of FIGS. 10A and 10B. In step 282 microprocessor 92 determines whether every block chain has been examined for available space. If even a single block chain has not been examined yet, microprocessor 92 branches down to step 284 from step 282.

In step 284 microprocessor 92 determines whether every chip in the current block chain has been searched for available space. If not, a chip is selected from the current block chain. The first chip chosen on the block chain is the last chip allocated into by the same process. Thus, if CPU 52 last wrote a sector into CP3, block 5, then the first block examined for the next write will be CP3, block 5. A block selected, microprocessor 92 branches to step 286.

In step 286, microprocessor 92 queries the status register of the current chip pair to see if the chip pair is busy. If that chip is busy then microprocessor 92 branches to step 288.

In step 288 microprocessor 92 selects the next chip on the current block chain. For example, if the chip pair 3, block 5 was selected in step 284 then chip pair 4, block 5 will be selected. This done microprocessor 92 branches back up to step 284.

In step 284, microprocessor 92 again checks to see if every block on the current block chain has been searched. As this is the second block on the chain to be examined, microprocessor 92 advances again to step 286.

Here microprocessor 92 determines whether the current chip pair is busy. If so, microprocessor 92 will branch through steps 288 and 284 as just described. On the other hand, if the current chip pair is not busy microprocessor 92 proceeds to step 289 of FIG. 10B.

Microprocessor 92 determines whether the currently selected chip pair is allocated to another caller. Microprocessor 92 does this in step 289 by comparing the chip pairs and blocks stored in RAM for other callers to the currently selected chip pairs and block. For example, let us assume that the caller is CPU 52 and that chip pair 4, block 4 is allocated to it. If a block in chip pair 4 is allocated to clean-up state machine 1, then microprocessor 92 will not allocate memory space within chip pair 4 to CPU 52. In this situation, microprocessor 92 proceeds to step 290 of FIG. 10B.

Another block on the current block chain is selected in step 290. From step 292 microprocessor 92 branches back up to step 284.

As we have assumed that earlier that memory will be allocated, microprocessor 92 will eventually reach step 291 by branching through steps 284, 286, and 289. In step 291, microprocessor 92 determines whether the current block selection is part of a chip that has another block targeted for clean-up. If so, the current block selection is undesirable unless erasure can be suspended to program. Otherwise, writing the sector would be delayed by erasure. To avoid this, microprocessor 92 selects another chip in the current block chain in step 292. The appropriateness of that block is then determined by branching through steps 284–291 again.

Microprocessor 92 reaches step 293 when a block that is not involved in clean-up is located. Here microprocessor 92 determines whether another header can be written into BSTT 84 of the current block consistent with the seek scheme. For example, in one embodiment only 2047 headers may be written into any BSTT given a maximum examination of eight headers per seek and the use of only 256 header pointers. If the maximum number of headers has already been written into BSTT 84, another block must be selected. Microprocessor 92 does so, by branching to step 294. Otherwise, microprocessor 92 continues its evaluation of the current block by branching to step 295.

In step 295 microprocessor 92 determines whether there is enough free memory within data space 86 of the current block to store the sector. This check is necessary because compression causes sector size to vary. As a result, the number of sectors that can be stored in data space 86 varies. Microprocessor 92 must select another block if data space 86 does not include sufficient memory to store the sector to be written. Microprocessor 92 does so in step 296.

Once a block with sufficient room to store the sector is located, microprocessor 92 performs one last check before allocating the sector data into the current block. In step 297, microprocessor 92 examines the block's block attribute data 90 to determine if the block is good. If it is not, microprocessor 92 advances to step 298 to select another chip on the current block chain. On the other hand, if the block is good, an appropriate block has finally been found. Microprocessor 92 responds by branching to step 299.

In step 299, for future reference microprocessor 92 stores in RAM, the chip pair and block just selected.

By branching to step 300, microprocessor 92 finally allocates memory for the sector to be written. Microprocessor 92 does this by writing the block sector offset into BSTT 84 of the selected block.

Microprocessor 92 updates FLASH array database 93 in step 301. The total amount of free memory within FLASH array 62, the chip and the block (TFFA, TFFC($C_M$) and TFFB($B_N$)) are decreased by size of the sector. When the database update is complete, microprocessor 92 branches to step 302.

Finally, in step 302 the chip pair, block, and offset to the header are returned to the caller. As used herein, "offset to the header" or "header offset" refers to the offset from the top of the block to the top of the header. Allocation complete, control returns to the caller in step 304.

There are a number of situations under which memory space cannot be allocated using the algorithm of FIGS. 10A and 10B. Perhaps memory cannot be allocated because solid state disk 60 is in standby mode or because an appropriate block cannot be located. However, and wherever, the decision is made that memory cannot be allocated, microprocessor 92 ends up in step 306.

Referring to FIG. 10A, in step 306, microprocessor 92 determines whether its inability to allocate memory can be remedied. That depends upon the caller that requested memory space. If the caller is CPU 52, microprocessor 92 advances to step 308. On the other hand, microprocessor branches to step 310 if the caller requesting memory space is one of the two clean-up state machines.

If the caller is CPU 52, the inability to allocate memory can be remedied by foreground clean-up. Accordingly, in step 308, microprocessor 92 initiates a foreground clean-up. As a result, CPU 52 will have to wait a relatively long time before any of its write commands are obeyed.

Very little need be done if memory cannot be allocated and the caller is one of the clean-up state machine. As will be described in detail later, foreground clean-up uses more than one clean-up state machine. In one embodiment, foreground clean-up uses two clean-up state machines The first clean-up state machine runs uninterrupted until it begins erasing a block. At that time, the second clean-up state machine is started. It may not be possible, however, to allocate memory to the second clean-up state machine because so many blocks are unavailable because of erasure by the first clean-up state machine. This is not catastrophic because completion of clean-up by the first clean-up state machine will produce large amounts of free memory. Microprocessor 92 prepares to await that event in step 310 by changing to idle, the status of the calling clean-up state machine. Microprocessor 92 then returns control to the caller in step 304.

FIGS. 12A and 12B illustrate in flow diagram form an alternate method of allocating free physical memory for host writes. Like the method of FIGS. 10A and 10B, choosing a block to allocate the write into may involve up to four decisions. Two of the decisions for allocating memory are made in essentially the same manner as they are made according to the method of FIGS. 10A and 10B. Those decisions are:

1. Is there enough reserve memory to permit the write?
2. Is this block an appropriate block to allocate the write into?

The method of FIGS. 12A and 12B increases data coherency for host writes by choosing a new block to allocate host write which has the largest amount of free memory rather than choosing the first block with enough memory to store the sector of data to be written, as done with the method of FIGS. 10A and 10B. As a result of choosing the block with the greatest amount of free memory, larger amounts of host data reside within the same block because writes are allocated into the chosen block until there is insufficient free memory to store another sector of data. This method of allocation increases data coherency.

Allocation of free physical memory begins in step 1202 by determining whether minimum memory reserves within flash array 62 would be maintained after writing the sector requested. If not, host CPU 52 is informed that solid state disk 60 is in FLASH STANDBY in step 1204. No further host writes will be permitted until host microprocessor 92 releases sufficient memory to reach minimum memory reserves. On the other hand, if minimum memory reserves are available, microprocessor 92 proceeds to step 1205.

To increase data coherency and decrease the possibility of data fragmentation, in step 1205 microprocessor 92 attempts to allocate the sector into the block host data was last written into. For simplicity's sake, let us refer to this block as "the previous block." Microprocessor 92 first determines which block is the previous block and ascertains the amount of free memory remaining in the previous block by referring to database 93. If the amount of free memory in the previous block is equal to or greater than the sector size, the sector will be written into the previous block. In that case, microprocessor 92 branches ahead to step 1262 to reserve memory in the previous block. On the other hand, if there is insufficient free memory in the previous block, microprocessor 92 branches to step 1206.

In steps 1206, 1208, and 1210 microprocessor 92 initializes variables used in the selection of a block. During these steps Most Free Block, Most Free Chip, and Greatest Score are initialized to zero. Most Free represents the amount of free flash memory in the Most Free Block. Afterward, microprocessor 92 advances to step 1212.

Step 1212 begins a block by block evaluation of each block in FLASH array 62. Each block is first examined to determine its appropriateness in steps 1214–1230. Once a block is found to be appropriate, the desirability of allocating the sector write into that block is determined by generating a score for the block in steps 1232–1240. The Total score for each block is then compared to Greatest Score. If that Total score exceeds Greatest Score, then Most Free, Most Free Block, Most Free Chip, and Greatest Score are all revised to reflect the values of the current block in steps 1243–1248.

Choosing a block begins in step 1212 by determining whether all blocks have been examined, and thus, whether a block has been selected for allocation. Microprocessor 92 does this by determining whether all chip pairs have been searched. The first pass through step 1212, microprocessor 92 selects a block for examination and branches to step 1214 because not a single chip pair has been examined.

In step 1214, microprocessor 92 queries the status register of current chip pair to see if the chip pair is busy. If that chip pair is busy, it will be unavailable for a relatively long period of time. For this reason, microprocessor 92 branches to step 1212 to select another block when the current block is part of a busy chip pair. Otherwise, microprocessor 92 advances to step 1216.

In step 1216, microprocessor 92 determines whether the current block is part of a chip pair that includes another block targeted for clean-up. If so, the current block selection is undesirable unless erasure can be suspended to program. Otherwise, writing the sector could be delayed by erasure. To avoid this, microprocessor 92 returns to step 1212 to selects another block. When a current block is selected that is not included in a chip pair targeted for clean-up, microprocessor 92 advances to step 1218.

During step 1218 microprocessor 92 determines whether memory in the currently selected block chip pair has been recently allocated to a clean-up state machine. Such a block is an inappropriate choice for a host write because it increases the possibility of data fragmentation. Microprocessor 92 makes this decision by comparing chip pair and block stored in RAM for clean-up state machine to the currently selected chip pair and block. For example, let us assume that the current block selection is chip pair 4, block 4. If a block in chip pair 4 is allocated to clean-up state machine 1, then microprocessor 92 will not allocate memory space within chip pair 4 to CPU 52. In these situations, microprocessor 92 returns to step 1212 to select another block.

In step 1220 microprocessor 92 examines the block attribute data 90 for the current block to determine if the block is good. If it is not, microprocessor 92 advances to step 1212 to select another block. On the other hand, if the block is good, microprocessor 92 responds by continuing its evaluation of the appropriateness of the current block.

Step 1230 is the final step in determining whether the current block is an appropriate block in assessing whether space remains in the BSTT 84 of the current block. If the maximum number of headers has already been written into BSTT 84, another block must be selected.

Exiting step 1230 to step 1232 of FIG. 12B means that the current block is appropriate for allocation for host writes. Thus, microprocessor 92 begins evaluating the desirability of the current block, as reflected by a total score encompassing a number of factors. The first factor considered is the total number of free words within the current block, $TFFB_C$. $TFFB_C$ is multiplied by a first weight (W1) to generate Rule 1, the value of which should be substantially larger than the value of other weights. This skews the selection of a block toward the block with the greatest amount of free physical memory.

Microprocessor 92 continues evaluation of the desirability by branching to step 1234. Microprocessor 92 examines the likelihood that the current block will be impacted by a future clean-up by subtracting the amount of dirty memory within the current chip pair, designated TDFC, from the total possible amount of dirty memory with the current chip pair, TPDFC. The remainder of this operation is then multiplied by weight 2 (W2) to generate Rule 2. The smaller TDFC, the larger Rule 2 and the less likely it is the current chip pair will soon be selected for clean-up.

The desirability of the current block is also evaluated in terms of the amount of dirty memory within the current block, TDFB. In step 1235, TDFB is multiplied by weight 3 (W3) to generate Rule 3.

Another factor evaluated in assessing the desirability of the current block is the number cycle counts of the current block compared to the maximum cycle count within array 62. This factor, represented by "delta cycle count" is multiplied by weight 4 W4 in step 1236 to generate Rule 4. This factor skews selection of a block toward blocks with lower cycle counts and results in passive wear leveling.

Microprocessor assesses the fifth and final factor of the current block's desirability in step 1238. That factor is whether any other block in the current chip has not been allocated into. This also provides some wear leveling by spreading sector data across chip boundaries. This factor is multiplied by weight 5 (W5) to generate Rule 5.

Microprocessor 92 generates a TOTAL score for the current block in step 1240 by adding together Rule 1, Rule 2, Rule 3, Rule 4, and Rule 5. Microprocessor 92 then compares this total to the Greatest Score. If TOTAL exceeds the Greatest Score then the current block is the most desirable block of the blocks that have been evaluated so far. Thus, in steps 1243, 1244, 1246, and 1248, Greatest Score, Most Free, Most Free Block and Most Free Chip are revised to reflect the values of the current block. Afterward, microprocessor 92 returns to step 1212 to evaluate another block in FLASH array 62.

After all blocks have been evaluated, microprocessor 92 branches to step 1250. There it is determined whether there is sufficient free memory in the most free block to store the sector of data that CPU 52 wants to write. If there is, allocation proceeds by branching to step 1262. Otherwise, microprocessor 92 branches to step 1260.

Entry to step 1260 means that FLASH array 62 must be cleaned-up before a block with sufficient free memory to store the current sector can be located. Thus, microprocessor 92 initiates foreground clean-up. Once a block has been cleaned-up, microprocessor 92 returns to step 1212 to select another block for allocation.

Eventually, a block with enough space to store the sector of data will be identified and microprocessor 92 will reach step 1262. Allocation of memory space for the sector of data begins in earnest by identifying the next available header in the BSTT 84 of the Most Free Block. The appropriate block sector offset for the sector is then written into that header in step 1264. Afterward, the total amount of free flash in the array, in the Most Free Chip and the Most Free Block are decreased by the size of the sector. Finally, in step 1266 microprocessor 92 indicates the chip pair, block and offset to the header now associated with the sector of data to be written.

D. Marking Dirty a Version of a Sector

FIG. 13 illustrates in flow diagram form an algorithm for marking a sector dirty, which is implemented by sectors 162. This algorithm is useful during writes, clean-up, and creation of the sector header translation table 94.

The mark dirty algorithm requires three pieces of information: the chip pair, block, and offset to the header for the sector data to be marked dirty. Given this information, the first task of microprocessor 92 in step 320 is to determine the availability of the chip pair storing that version of the sector data. Therefore, in step 320, microprocessor 92 reads the status register associated with the appropriate chip pair. If the chip pair is busy microprocessor 92 branches to step 322. On the other hand, if the chip pair is not busy, microprocessor 92 branches to step 324.

Entry into step 322 means that the desired sector is unavailable. Clean-up is the sole possible explanation for unavailability of the chip pair. Rather than waiting for clean-up to finish, microprocessor 92 figuratively leaves itself a note to mark the previous copy of the sector dirty. Microprocessor 92 does this by caching the chip pair, block, and offset to the header of the sector data to be marked dirty. When clean-up is complete, the cache will be checked and the sector marked dirty. Afterward, microprocessor 92 branches to step 326 to return control to its caller.

Microprocessor 92 proceeds to step 324 from step 320 if the chip pair storing the previous copy of the sector data is not busy. There microprocessor 92 marks dirty the copy of the sector pointed to by chip pair, block and offset. The sector of data is marked dirty by setting to 0, dirty bits in the attribute word of the sector's header. This done, microprocessor 92 proceeds to step 326, returning control to the caller.

Ill. Clean-Up of the Solid State Disk

Solid state disk drive 60 achieves write speeds close to conventional magnetic disk drives by writing a sector of data to a new location each time it is revised, rather than erasing the previous location and writing the revised data to that same physical location. As a result of this practice, solid state disk 60 becomes sprinkled with dirty sectors. Recovering the memory space occupied by dirty sectors mandates clean-up. Stated slightly differently, the write practices of solid state disk controller 64 require that dirty sectors be converted into free memory.

Briefly described, clean-up involves three major tasks. First, a block is selected as the focus of clean-up. Second, sectors of valid user data are copied from the focus block into other blocks, referred to as destination blocks. Third, after all valid sectors have been copied out of it, the focus block is erased, converting dirty sectors into free memory.

Clean-up is a background process, generally. Clean-up is able to run as a background process because reads and writes to FLASH array 62 generally occur in bursts. As a result, there are relatively long periods of time when microprocessor 92 is free to perform clean-up.

Clean-up is managed by a finite state machine, called a clean-up state machine. That is, clean-up is achieved using a finite number of states, or algorithms, which are chained together. Each clean-up state points to the next state, in effect chaining each state to another state. Each state takes no more than 500 µseconds of microprocessor 92 time to execute.

Background clean-up uses a single clean-up state machine, and is granted execution time only when host interface 152 is inactive. In contrast, two clean-up state machines run simultaneously during foreground clean-up of solid state disk 60. Clean-up becomes a foreground task when write commands from CPU 52 cannot be executed because of lack of free memory for write requests.

Background and foreground clean-up are both handled by clean-up object 164 of solid state disk controller 64. FIG. 14 illustrates in block diagram form the high level algorithms of clean-up object 164. Algorithms include Enable CSM 340, Force Clean-up 342, Force Multi Clean-up 344, Execute One State 346, and Multi CSM Execute Until Condition 348.

Background clean-up is initiated when Enable CSM algorithm 340 is called. Enable CSM 340 is called whenever the host writes to solid state memory disk 60. For example, Enable CSM 340 is called in step 262 of the write algorithm of FIG. 9. Enable CSM 340 activates a clean-up state machine by setting a CSM next state pointer to a clean-up state.

Execution of that first clean-up state occurs whenever top level scheduler 150 allocates microprocessor 92 time to clean-up. Top level scheduler 150 does so by calling Execute One State algorithm 346. Execute One State 346 calls the state pointed to by the CSM next state pointer. That state, whichever it is, modifies the next state pointer prior to surrendering control of microprocessor 92. Thus, each time top level scheduler 150 allocates execution time to clean-up another step will be executed by calling Execute One State.

Foreground clean-up begins by calling service 348 of clean-up 164. Multi CSM Execute Until Condition 348 is called when no free memory can be allocated for a write request. This represents a decision that free memory needs to be generated before anymore writes will be executed. Multi CSM Execute Until Condition 348 does this by enabling two clean-up state machines.

In contrast to foreground and background clean-up, both ForceCleanUp 342 and Force Multi Clean-up 344 are called by CPU 52. Force Clean-Up 342 enables one clean-up state machine, while Force Multi Clean-up 344 enables two clean-up state machines.

A. Background Clean-Up

1. Initiating Background Clean-Up and the Linking of Clean-up States

Background clean-up is initiated by a call to Enable CSM 340. A flow diagram for Enable CSM 340 is shown in FIG. 15.

The first task of microprocessor 92 in step 360 is to determine whether clean-up state machine 1 is already active. If so, nothing is to be done. In that case, microprocessor 92 branches to step 361 without doing anything. If clean-up state machine 1 is not active microprocessor 92 branches to step 362.

In step 362, microprocessor 92 performs the first of the two small tasks necessary to begin background clean-up. There microprocessor 92 brings clean-up state machine 1 (CSM1) active by setting a variable, CSM1.status, to active. This done, microprocessor 92 proceeds to step 364.

Next, microprocessor 92 performs the second task required to set-up background clean-up. This is done by setting CSM1 next state pointer to Evaluate If Clean-up Is Needed state 380. The next time top level scheduler 150 calls Execute One State 346 background clean-up will begin. Its job done, microprocessor 92 branches to step 361.

FIG. 16 is a flow diagram of execute one state 346, the algorithm that chains the states of a clean-up state machine together. The mechanism that allows a single algorithm to chain many states together is the CSM next state pointer. Each clean-up state machine has its own next state pointer, which is updated at the end of each state.

Upon entry to Execute One State 346, microprocessor 92 determines whether the second clean-up state machine, SM2, is active by examining CSM2.status. If CSM2 is not active, microprocessor 92 branches directly to step 370. On the other hand, CSM2 may be active as a result of a foreground clean-up that is just finishing-up. In this case, microprocessor 92 executes another state of CSM2 in step 368. Control is then returned to the caller in step 374.

Once CSM2 is idle, microprocessor 92 will devote its attention to CSM1 if CSM1 is active. Microprocessor 92 makes this determination in step 370. If CSM1 is inactive, nothing is to be done but to return control to the caller in step 374. Otherwise, the state pointed to by the CSM1 next state pointer is executed. Afterward, control is returned to the caller in step 374.

2. Overview of the States of a Clean-up State Machine

What is the chain of events during clean-up? Briefly described, clean-up involves three major tasks regardless of the type of clean-up. First, a block is selected as the focus of clean-up. Second, on a good sector-by-good sector basis, user data is relocated from the focus block into destination blocks. Relocation of user data is itself a multistep process, requiring allocation of memory, copying of the sector into the destination blocks, and updating of FLASH database 93. Third, after all user data has been copied out of it, the focus block is erased, converting dirty sectors into free memory.

FIG. 17 gives an overview of clean-up by illustrating each state of a clean-up state machine. Each bubble in FIG. 17 represents one state, or algorithm, of a clean-up state machine. The arrows between states represent the next state pointed to by the CSM next state pointer at the end of a state.

Background clean-up begins in state 380 by evaluating whether clean-up is necessary. Evaluation of whether clean-up is necessary is skipped during foreground clean-up and forced clean-up. If clean-up is not necessary microprocessor 92 branches down to state 396. This returns control of microprocessor 92 to top level scheduler 150. On the other hand, if clean-up is deemed necessary, a number of blocks will be cleaned up. The selected number of blocks is indicated by a counter. Afterward, microprocessor 92 is pointed to state 382 by the CSM next state pointer.

Clean-up begins in earnest in state 382 by selecting a focus block to clean-up. The next state pointer then points microprocessor 92 to state 383.

Prior to cleaning up dirty sectors within the focus block, valid sectors of user data must be safely relocated. This task requires branching through states 383, 384, 385,386, and 388 repeatedly until each and every sector of user data within the focus block has been safely copied into new locations. Relocation of user data begins in state 384 by locating a new physical location for one good sector of user data. The block selected as the new location is referred to as a destination block. According to this terminology, clean-up has one focus block but may have many destination blocks. Microprocessor 92 is then pointed to state 385 by the CSM next state pointer.

In state 385, the sector is copied from the focus block into sector buffer 98.

In state 386 microprocessor 92 copies part of a valid sector from the sector buffer to the current destination block. Only a part of the valid sector is copied at one time given write speeds and the desire to keep background clean-up from impacting response to read and write commands from CPU 52. Thus, microprocessor 92 may pass though state 386 several times before a valid sector is completely copied into destination block. Once the valid sector has been completely copied, the CSM next state pointer directs microprocessor 92 to state 388.

During state 388 microprocessor 92 updates sector header translation table 94 so that it points to the new location of the sector just copied from the focus block if the previous version of the data for the sector number was not marked dirty. Otherwise, microprocessor 92 marks dirty the version of the sector it has just copied. Finally, microprocessor 92 finishes writing the header associated with the new version of the sector data for the sector number. Microprocessor 92 then returns to state 383.

Upon reentry to state 383, microprocessor 92 determines whether every good sector within the focus block has been relocated. If not, another good sector will be selected for relocation, and microprocessor 92 will branch through states 384, 385, 386, 388 and 383 until every good sector within the focus block has been relocated. When that occurs, the CSM next state pointer directs microprocessor 92 to state 390.

Microprocessor 92 begins erasure of the focus block in state 390. Microprocessor 92 initiates erasure by giving an erase command to the chip pair and indicating the block to be erased. This done, microprocessor 92 proceeds to state 392 to wait for the completion of erasure. The CSM remains in state 392 until the chip pair including the focus block indicates completion of erasure.

The focus block erased, microprocessor 92 updates and copies block attribute data 90 back into the focus block. This done microprocessor 92 is redirected to state 380 by the CSM next state pointer.

Upon reentry to state 380, microprocessor 92 examines the block counter to determine if another focus block should be selected. If so, microprocessor 92 will branch through states 382, 384, 386, 388, 390, 392, and 394 as described. Otherwise, microprocessor 92 branches to step 396, clean-up complete.

3. Evaluating If Clean-up Is Necessary

FIG. 18 illustrates in flow diagram form the algorithm used in state 380 to evaluate whether FLASH array 62 should be cleaned-up. Using this algorithm, background clean-up is triggered when total dirty memory rises above a set percentage of total memory reserves. Total memory reserves are defined as the sum of total free memory (TFFA) and total dirty memory (TDFA). The percentage of total dirty to total reserves affects the performance and power efficiency of solid state disk 60.

Microprocessor 92 begins in step 400 by determining whether evaluation is necessary. This is done by examining a counter to determine the number of blocks remaining to clean-up. Any number greater than zero indicates that clean-up has already been triggered and further evaluation is not necessary. The first time microprocessor 92 enters state 380 the counter will be less than zero, forcing microprocessor 92 to branch to step 402.

In step 402 microprocessor 92 calculates the total amount of dirty memory within FLASH array 62 as a percentage of total memory reserves.

In step 404 the percentage calculated in step 402 is compared to a clean-up trigger point. The clean-up trigger point may be fixed at a certain percentage of total memory reserves or it may be adaptively varied based upon the demands of CPU 52. An algorithm for adaptively varying the clean-up trigger point will be described in detail later. If the total dirty is equal to, or exceeds, the trigger point, microprocessor 92 sets background clean-up in motion by branching to step 406. On the other hand, if the percentage of total dirty memory does not exceed the trigger point microprocessor 92 branches to step 409. Because clean-up is not necessary, the status of CSM1 is set to idle. Control is returned to top level scheduler 150 without initiating clean-up by branching to state 410.

Microprocessor 92 sets the block counter in step 406 to the maximum number of blocks to be cleaned-up. In one embodiment, that maximum is set to three. This done, microprocessor 92 advances to step 408.

In step 408, microprocessor 92 advances the CSM next state pointer to the next state in the clean-up process, state 382. This done, microprocessor 92 returns control to top level scheduler 150 by branching to step 410.

During subsequent calls to evaluate if clean-up is necessary, state 380 microprocessor 92 begins by examining the block counter in step 400. If the block counter exceeds zero the need for clean-up will not be evaluated. Instead, microprocessor 92 decrements the block counter and branches to step 401.

In step 401 microprocessor 92 points the CSM next state pointer to state 382, Choose Block To Clean-up. Microprocessor 92 then exits state 380 via return step 410.

FIG. 19 illustrates in flow diagram form an algorithm for adaptively varying the trigger point used in step 404 to evaluate whether clean-up is necessary. The algorithm shown belongs to sectors 162.

In step 412, microprocessor 92 determines whether the trigger point has been set too low; that is, whether FLASH array 62 is being allowed to get too dirty. Microprocessor 92 does this by determining whether some number of foreground clean-ups have occurred in the last M writes, where M is a large number. If so, microprocessor 92 advances to step 414. Otherwise, microprocessor 92 branches to step 416.

In step 414 microprocessor 92 decreases the trigger point by a small amount, because FLASH array 62 has been allowed to get too dirty. The effect of this is to keep FLASH array 62 from becoming as dirty in the future. From step 414 microprocessor 92 returns control to the calling program.

In step 416, microprocessor 92 considers whether FLASH array 62 is being kept too clean. Microprocessor 92 determines this by evaluating the number of foreground erases in the last N writes, where N is a large number. If there has not been a foreground erase in a very long time microprocessor 92 branches to step 418. Otherwise, microprocessor 92 proceeds to step 420 without changing the trigger point.

Microprocessor 92 increases the trigger point slightly in step 418. This allows FLASH array 62 to become slightly dirtier before background clean-up is triggered, which improves clean-up efficiency. The trigger point adjusted, microprocessor 92 returns control to the calling program by branching to step 420.

4. Choosing a Block to Clean-Up

Once clean-up is triggered, a focus block is chosen in state 382. The goal in choosing a focus block is to select the block that it is most cost effective to clean. Cost effective clean-up involves striking a balance between keeping FLASH array 62 so clean that power consumption is excessive and keeping FLASH array 62 so dirty that foreground clean-up frequently occurs. A number of factors are to be considered in determining whether a block is a cost effective focus for clean-up. First, how dirty is the block? The dirtier a block is the more cost-effective it is to erase that block. In selecting a focus, this factor is weighted heaviest to skew the decision toward minimizing foreground clean-ups. Second, how much free memory is in the chip pair that the focus is part of? This factor is considered only for FLASH memory devices without the ability to suspend erasure to program. In FLASH devices without the ability to suspend erasure, every block within the chip pair is unavailable during the erasure of a single block. This reduces the desirability of cleaning up a particular block if lots of free memory resides within the same chip pair. Third, how much valid user data, or good data, is there within the focus block? This also reduces the desirability of choosing a particular block as focus because it increases the number of sectors that must be copied out. Stated conversely, the fewer good sectors that must copied out the more desirable a block is to clean-up. Other factors may be considered when choosing a focus block.

FIG. 20 illustrates an algorithm for choosing a block to clean-up in state 382 which uses the factors discussed above. Briefly described, a block is chosen as a focus of clean-up by generating a score for each block within FLASH array 62. The score is generated by appropriately weighting each of the factors and summing the weighted factors together. The block with the highest total score is selected as the focus of clean-up.

Choosing a focus block begins in step 440 by determining whether all blocks have been examined, and thus, whether a focus block has been selected. Microprocessor 92 does this by determining whether all chip pairs have been searched. The first pass through step 440, microprocessor 92 branches to step 444 because not a single chip pair has been examined.

In step 444 microprocessor 92 selects a block to examine within the selected chip pair. Microprocessor 92 then advances to step 445 if every block has not been examined yet.

In step 445, microprocessor 92 determines whether the block is part of a chip pair that is currently the focus of clean-up by another clean-up state machine. This makes the current block a less desirable focus block because all blocks within a chip targeted for clean-up will be unavailable at some point for a long period of time. Microprocessor 92 is able to determine whether a chip is targeted for clean-up by another clean-up state machine by examining the chip pair and block information stored in RAM. After multiplying this factor by weight 0 (WEIGHT0) to generate Rule 0, microprocessor 92 then advances to step 446. The Rule 1 score is generated by multiplying the total number of dirty words within the current block $TDFB_C$, by a first weight (WEIGHT1). The value of this rule should be substantially larger than the value of subsequent rules. Microprocessor 92 then branches to step 448 from step 446.

Microprocessor 92 calculates a Rule 2 score for the current block in step 448. There the total amount of free FLASH within the selected chip pair $TFFC_C$ is multiplied by a second (WEIGHT2). Afterward, microprocessor 92 branches to step 449.

A Rule 3 score is calculated in step 449. The desirability of a block is evaluated there in terms of whether the current block resides within the chip pair last erased. Afterward, microprocessor 92 advances to step 450.

In step 450 microprocessor 92 calculates a Rule 4 score for the current block. Microprocessor 92 begins calculating this score by subtracting the total number of good bytes in the current block from the total number of bytes within that block. Microprocessor 92 then multiplies this number by a fourth weight (WEIGHT4). The WEIGHT4 is meant to bias slightly the selection of a focus block towards choosing a block with less good sector data. Thus, microprocessor 92 then branches to step 451. The value of the fourth rule is relatively small compared to the first rule.

The Rule 5 score for the current block is generated during step 451. This factor skews selection toward blocks with lower cycle counts, thus, performing passive wear leveling. The fewer cycle counts of the current block compared to the maximum cycle count within array 62, the more desirable the block is. This factor, represented by "$\Delta$ cycle count" is then multiplied by the fifth weight (WEIGHT5).

In step 452 microprocessor 92 generates a total score for the block by adding together Rules 1, 4, and 5, which reflect desirable characteristics of the current block. From this sum Rules 0, 2, and 3 are subtracted because they indicate undesirable characteristics of a focus block.

Advancing to step 454, microprocessor 92 then compares the total score for the current block to the GREATEST SCORE. If the total score for the current block exceeds the GREATEST SCORE, then the GREATEST SCORE is revised upward and microprocessor 92 advances to step to 456. On the other hand, microprocessor 92 branches back up to step 444 if TOTAL SCORE for the current block is not greater than the GREATEST SCORE.

In step 456 microprocessor 92 stores the chip pair, and block and score of the block with the current GREATEST SCORE. Microprocessor 92 then returns to step 444.

Upon reentry to step 444 microprocessor decides whether every block within the currently selected chip pair has been evaluated. If not, microprocessor 92 branches through steps 445, 446, 448, 449, 450, 451, 452, 454, 456, and 444 until every block within the selected chip pair has been evaluated. Microprocessor 92 branches back to step 440 once every block within the selected chip pair has been evaluated.

Step 440 determines whether the blocks within every chip pair have been examined. If not, microprocessor 92 branches through steps 444, 445, 446, 448, 449, 450, 451, 452, 454, 456, and 440 until all blocks in all chip pairs within FLASH array 62 have been evaluated. Microprocessor 92 then proceeds to step 458.

Microprocessor 92 writes the chip pair and block selected as the focus of clean-up into the focus window. Microprocessor 92 uses the block and chip address stored in step 456 to do this. Afterward, microprocessor proceeds to step 460.

Having reached its current goal, in step 460 microprocessor 92 sets the CSM next state pointer to allocate free physical sector, state 384.

From step 460 microprocessor 92 returns control to top level scheduler 150 by branching to step 462.

5. Allocating Free Physical Sectors for Clean-up

Prior to erasing the focus block, all valid sectors of user data must be copied from the focus block and relocated into destination blocks. The first step in the relocation process is allocating memory space for the sectors of the user data currently residing in the focus block. FIG. 21 illustrates an algorithm for state 384, which manages the allocation of memory during clean-up.

Microprocessor 92 begins allocation in step 472 by determining whether every good sector within the focus block has been relocated. Microprocessor 92 makes its decision by scanning down BSTT 84 of the focus block until reaching the next header. Every sector of user data has been copied out of the focus block if the attribute word in the header is FFFF (hexadecimal). In that case, microprocessor 92 branches to state 480. If every valid sector has not been copied out, microprocessor 92 examines the attribute word to see if the sector is valid or dirty. Dirty sectors cause microprocessor 92 to scan down BSTT 84 to the next header. Microprocessor 92 responds to good sectors by determining the sector size and advancing to step 474.

In step 474 microprocessor 92 allocates memory for the sector identified in step 472 by calling the allocate algorithm of FIGS. 10A and 10B or an alternate algorithm to be discussed later. Afterward, microprocessor 92 advances to step 476.

Microprocessor 92 prepares to exit state 384 in step 476 by resetting the CSM next state pointer to state 385. Thus, when background clean-up resumes execution, copying of the sector from the focus block into sector buffer 98 will begin. This done, microprocessor 92 returns control to top level scheduler 150 by branching to step 478.

Microprocessor 92 returns again and again to state 476 until every valid sector has been copied out of the focus block. Once that occurs, microprocessor 92 branches to step 480 from step 472. In step 480 microprocessor 92 initiates focus block erasure by appropriately setting the CSM next state pointer to start erase. Control is returned to the calling program.

6. Allocating Free Physical Memory for Clean-up

FIG. 22 illustrates in flow diagram form an alternate method of allocating free physical memory for clean-up. A block selected as a destination block for clean-up must be both appropriate and desirable. The appropriateness of a block is assessed in essentially the same manner discussed previously with respect to the allocation methods illustrated in FIGS. 10A, 10B, 12A, and 12B. However, the assessment and definition of a desirable destination block differs. The most desirable destination block is the block that most closely fits the sectors of user data to be copied out of the focus block. Defining the desirability of a destination block in this manner increases the coherency of user data by preserving large amounts of free data for host writes.

Allocation of memory during clean-up begins with initialization of variables used in the selection of the destination block. In steps 2202 and 2204 Best Fit Block and Best Fit Chip are both set to 0.

In step 2206 microprocessor 92 calculates the amount of free memory necessary to store the remaining sectors of user data within the focus block. Thus, even though memory for only one sector is allocated at a time, desirability is evaluated in terms of a block capable of storing all the remaining sectors of user data within the focus block. (As used herein, "sectors of user data" and "user data" is defined as memory that is neither free, nor dirty.)

In step 2207 microprocessor 92 initializes one more variable prior to beginning its evaluation of possible destination blocks. Score is initialized to a maximum value representative of the maximum amount of free memory in any block. Score is revised during evaluation to indicate the score of the most desirable destination block; that is the block whose available free memory is closest to the total free memory needed. This done, microprocessor 92 advances to step 2208.

The appropriateness of each block as a destination block is evaluated in steps 2208–2216 in the same manner discussed with respect to FIGS. 12A and 12B. Therefore, these steps are not discussed in detail.

Eventually an appropriate block will be identified and microprocessor 92 will reach step 2216. There the desirability of the current block as a destination block will be determined. One factor defines destination block desirability according to the service of FIG. 22. How closely does the amount of free memory in the current match the amount of free memory needed to store all sectors of user data remaining within the focus block? A variable, TOTAL, measures the desirability of the current block in terms of the free memory remaining after storing the user data within the focus block. TOTAL may be a positive number or a negative number, depending upon whether the free memory in the current block is too great or too little. Microprocessor 92 then branches to step 2220. necessary, but it improves the reliability of user data by taking advantage of the error detection capabilities of an error detection circuit that is in the path of sequencer 168.

The algorithm of FIG. 23 handles the copying of a sector of user data from the focus block to sector buffer 98. First, in step 480, the sector is moved into sector buffer 98. Second, in step 482, microprocessor 92 sets the next state pointer to copy part of a sector. Control is then returned to the caller in step 484.

Copying a sector from its temporary refuge in sector buffer 98 into the destination block is the responsibility of state 386, called Copy Part of Sector. Only part of the sector is copied each time state 386 is executed to ensure that its execution time is less than a selected maximum execution time. In one embodiment the maximum execution time of each state is limited to 500 μseconds.

FIG. 24 illustrates an algorithm for copying part of a sector from sector buffer 98. Microprocessor 92 begins in step 490 by deciding if the rest of the sector can be copied into the destination block within the maximum execution time. In one embodiment, microprocessor 92 does this by comparing to 20 the number of bytes remaining to be copied from sector buffer 98. The maximum number of words that can be copied will vary depending upon the selected maximum execution time. Microprocessor 92 branches to step 492 if it cannot copy the remainder of the sector within the maximum execution time.

In step 492 microprocessor 92 copies 20 bytes from sector buffer 98 to the destination block indicated by the clean-up state machine's destination window. Afterward, microprocessor 92 branches to step 494.

In step 494 microprocessor 92 points the CSM next state pointer back to state 386, guaranteeing that all of the sector will eventually be copied out of In step 2220 microprocessor 92 determines whether the current block is a better fit than the block currently selected as the best fit. In other words, the absolute value of Total-$_{CurrentBlock}$ is compared to the absolute value of Score. Using absolute values in the comparison ensures that blocks that are too small are considered as well as blocks that have more free memory than is strictly necessary. Microprocessor 92 returns to step 2208 to evaluate another block if the absolute value of Total$_{CurrentBlock}$ is not less than the absolute value of Score. On the other hand, if the current block is a better fit than a previous block then microprocessor 92 branches to step 2222 to revise best fit values.

Score is reset to Total$_{CurrentBlock}$ in step 2222. Afterward, in steps 2224 and 2226 Best Fit Chip and Best Fit Block are revised so that they point to the current block. This done, microprocessor 92 returns to step 2208 to evaluate another block.

After evaluating each block within FLASH array 62 microprocessor 92 exits from step 2208 to step 2238. Microprocessor 92 then determines whether there is sufficient memory in Best Fit Block to store the sector of data currently being moved out of the focus block. If not, microprocessor 92 idles the current clean-up machine in step 2230. Otherwise, microprocessor 92 advances to step 2231 to begin the process of actually reserving memory in the Best Fit Block, which it does in steps 2231–2236 in the same fashion as discussed previously with respect to FIGS. 10A, 10B, 12A and 12B.

7. Copying Good Sectors

Copying a sector from the focus block into a destination block is a two step process. The selected sector of valid user data is first copied from the focus block into sector buffer 98. Secondly, the valid sector is copied from sector buffer 98 into the destination block. This two step process is not sector buffer 98. Control is returned to top level scheduler 150 when microprocessor 92 branches to step 500.

Eventually there will be a pass through state 386 in which all remaining words can be copied into the destination block within the maximum execution time. During this pass, microprocessor 92 branches from state 490 to state 496.

Microprocessor 92 copies all the words remaining in sector buffer 98 into the destination block in step 496. Afterward, microprocessor 92 advances to step 498.

Having completely relocated the valid sector into its destination block, microprocessor 92 prepares to update sector header translation table 94 to reflect the sector's new physical location. At this point, microprocessor 92 also finishes writing the header for the new sector of data. This is done in step 498 by resetting the CSM next state pointer to state 388. Copying of the sector finished, microprocessor 92 exits state 386 via step 500.

8. Updating Databases After Copying a Sector

Updating of BSTTs 84 and SHTT 94 is delayed until after a sector of user data has been completely relocated from the focus block to the destination block. This ensures that CPU 52 always has access to a valid copy of the sector, even while the sector is being relocated. Thus, CPU 52 is free to re-write the sector while the sector is being moved. As a result, there can be three or more versions of the same sector of data within FLASH array 62, only one version of which is valid. When this occurs, microprocessor 92 has effectively copied a dirty sector during state 386. The Post Copy Database Update algorithm of state 388 anticipates this problem by determining which databases should be updated and how they should be updated.

FIG. 25 illustrates a flow diagram for updating databases during state 388. Microprocessor 92 begins this task in step 502 by determining whether the host has written the sector while the CSM was copying it. Microprocessor 92 can determine this by checking if the header for the sector just relocated has been marked dirty. Let us call this header$_{Focus}$. Once microprocessor 92 knows this, it knows which translation tables should be updated and how they should be updated. There are two possibilities.

Consider first the train of events when header$_{FOCUS}$ is not marked dirty. In this situation, sector header translation table 94 and block sector translation tables 84 for both the destination block and focus block must be updated. To begin to do so microprocessor 92 branches from step 502 to step 506.

Database updates begin with the destination block. In step 506, microprocessor 92 writes the LSN into BSTT 84 of the destination block. Afterward, microprocessor 92 branches down to step 508.

Microprocessor 92 changes the address of the sector within SHTT 94 so that it points to the header in the destination block, rather than the header in the focus block. Microprocessor 92 then advances to step 510.

Microprocessor 92 completes the updating of all three translation tables in step 510. There microprocessor 92 marks dirty the header in the focus block. Microprocessor 92 does so by calling the mark dirty algorithm of FIG. 13. Database updates complete, microprocessor 92 branches to step 512.

Entry to step 512 indicates copying of a sector is complete. Microprocessor 92 prepares to scan the focus block for another good sector to copy in step 512 by setting the CSM next state pointer to allocate free physical sector state 384.

Afterward, control of microprocessor 92 is returned to top level scheduler 150 by branching to step 514.

What happens if the sector is revised while it is being relocated to the destination block? As it has already been marked dirty, header$_{FOCUS}$ need not be revised. Nor does SHTT 94 require revision because it already points to the header associated with the revised sector. Only BSTT 84 of the destination block requires revision to reflect that the header in the focus block is invalid. Microprocessor 92 begins this task by branching from step 502 to step 516.

Microprocessor 92 updates BSTT 84 of the destination block in step 516 by calling the mark dirty algorithm of FIG. 13. As before, microprocessor 92 returns control to top level scheduler 150 by branching block 514.

9. Erasing the Focus Block

Conversion of dirty sectors into free memory via erasure begins after copying all good sectors out of the focus block. Erasure of the focus block involves initiating erasure and then waiting for erasure to finish.

FIG. 26 illustrates an algorithm for initiating erasure in state 390. Prior to issuing an erase command, in step 520 microprocessor 92 preserves block attribute data 90 in step 520 by copying it to sector buffer 98.

At last, in step 522 microprocessor 92 issues the erase command to the chip pair including the focus block. Nothing remains to be done now but to wait.

Microprocessor 92 prepares for its long wait in step 524 by setting the CSM next state pointer to wait for erase complete state 392. Microprocessor 92 then returns control to the calling program by branching to state 526.

FIG. 27 illustrates an algorithm used to wait for and detect the completion of erasure. In step 530, microprocessor 92 determines whether erasure is still on-going by querying the chip pair's status register. As long as the status register indicates that erasure is not complete, microprocessor 92 branches to step 532. There microprocessor 92 prepares to continue its wait by setting the CSM next state pointer to wait for erase complete state 392. Once erasure is complete, microprocessor 92 branches to state 534, where the CSM next state pointer is set to post erase update state 394.

10. Posterase Database Update

A few tasks require attention after the focus block has been erased. These tasks are managed by posterase database update state 394, which is illustrated in FIG. 28.

The first task tackled by microprocessor 92 is updating the FLASH array database in step 536 to reflect the increased number of cycle counts caused by the preceding erasure.

The second task performed by microprocessor 92 is the restoration to the focus block of its block attribute data 90 with the new cycle count, which was stored in sector buffer 98 during erasure. Microprocessor 92 does this in step 538.

Microprocessor 92 performs its last update task in step 540. There microprocessor 92 clears a semaphore stored in RAM which indicates that the block is a focus of clean-up. As a result, the allocate algorithm of FIG. 11 is free once again to allocate sectors, if possible, into the chip pair including the former focus block.

Before exiting state 394 microprocessor 92 resets the CSM next state pointer to state 380, in step 542, Evaluate If Clean-Up is Necessary.

B. Foreground Clean-Up

The goal of foreground clean-up is to generate rapidly a large amount of free memory within FLASH array 62. Foreground clean-up achieves its goal by simultaneously operating two clean-up state machines and forcing CPU 52 to wait for free memory. Thus, foreground clean-up differs from background clean-up by impacting the computer user. Foreground clean-up also differs in the manner in which it is triggered as compared to background clean-up. When active, background clean-up is initiated after each write of a sector by CPU 52. Foreground clean-up is triggered during the allocation of free physical memory. If sufficient free FLASH memory to write a sector cannot be allocated then a call to MultiCSM execute until condition 348 begins foreground clean-up. Additionally, foreground clean-up differs from background clean-up by foregoing evaluation of whether clean-up is necessary, that decision effectively being made during allocation of free memory. Foreground clean-up therefore begins by choosing a block to clean-up.

FIG. 29 illustrates the algorithm used to manage foreground clean-up, MultiCSM Execute Until Condition 348. Using this algorithm, the first clean-up state machine is activated and allowed to run continuously until it reaches Wait for Erase Complete state 392. At that point, the second clean-up state machine is activated and allowed to run continuously until it reaches Wait for Erase Complete state 392. The first clean-up state machine then completes the clean-up of its focus block without interruption. With one block clean, and another block to be clean shortly, microprocessor 92 again responds to commands from CPU 52.

Foreground clean-up begins in step 550 where microprocessor 92 sets to one the block counts for both the first clean-up state machine and the second clean-up state machine. Recall from the discussion of FIG. 17 that the block count determines how many blocks are cleaned-up, and thus how long clean-up lasts. Setting both block counts to one minimizes foreground clean-up execution time. Microprocessor 92 then advances to step 552.

With step 552 microprocessor 92 begins the process of activating both clean-up state machines, which continues through step 562. Microprocessor 92 determines whether the first clean-up state machine, CSM1, is active in step 552 by examining the status of CSM1. If CSM1 is not active, microprocessor 92 branches to state 554 to activate it. On the other hand, if CSM1 is already active, microprocessor 92 branches to step 558 to activate the second clean-up state machine, CSM2.

Microprocessor 92 changes the status of CSM1 from idle to active in step 554. Microprocessor 92 proceeds from step 554 to step 556.

Microprocessor 92 prepares CSM1 to begin clean-up by setting its next state pointer to Choose Block to Clean-up state 382. This done, microprocessor 92 turns its attention to CSM2 by branching to step 558.

Microprocessor 92 determines whether CSM2, is active in step 558. If so, microprocessor 92 proceeds to step 564 to start running CSM1. Otherwise, microprocessor 92 branches to step 560.

Microprocessor 92 sets CSM2 to its active state in step 560. Afterward, in step 562, microprocessor 92 prepares CSM2 to begin clean-up by setting its next state pointer to choose block to clean up state 382.

Set-up of the two clean-up state machines complete, microprocessor 92 is finally able to start one up. In step 564, microprocessor 92 determines which clean-up state machine should be given execution time. Microprocessor 92 does this by determining whether CSM1 has begun erasing a block. If CSM1 has not, microprocessor 92 proceeds to step 566.

Microprocessor 92 executes one state of CSM1 in step 566. Microprocessor executes CSM1 states until wait for erase complete state 392. Microprocessor 92 reaches states 392 by looping repeatedly through steps 566 and 564. When CSM1 reaches wait for erase state 392, microprocessor 92 turns its attention to more fruitful fields by branching to state 568.

Microprocessor 92 determines whether CSM2 requires additional execution time to finish cleaning its focus block in step 568. If so, microprocessor 92 branches to step 570 where a single state of CSM2 is executed. Microprocessor executes CSM2 states until wait for erase complete state 392. At this point, microprocessor turns its attention once again to CSM1 by branching from step 568 to step 572.

In step 572 it is determined whether CSM1 has completed its clean-up of its focus block. Microprocessor 92 does this by examining the status word associated with CSM1. If CSM1 is not idle, microprocessor 92 branches to step 574 to execute another CSM1 state. By branching back and forth between steps 572 and 574, microprocessor 92 eventually completes the clean-up managed by CSM1. At this point, one block has been completely cleaned-up and another block will shortly be cleaned-up. With a large reserve of free memory imminent, microprocessor 92 returns control to top level scheduler 150 by branching to step 576. Foreground clean-up thus ceases.

C. Forced Clean-up

Forced clean-up is yet another way of activating and controlling clean-up state machines. Forced clean-up differs from both foreground clean-up and background clean-up in that it is initiated by a command from the computer user. In this type of clean-up, the computer user decides that clean-up is necessary without evaluating the total amount of free memory, as done in state 380.

Solid state disk controller 64 recognizes two types of forced clean-up. One type of forced clean-up activates only one clean-up state machine. This type of clean-up is managed by a service named Force Cleanup 342. The other type of clean-up activates two clean-up state machines and is managed by a service called ForceMultiCleanup 344.

FIG. 30 illustrates an algorithm for Force Clean-up 342. The task of ForceCleanup is relatively simple: activate and start-up CSM1, if necessary.

In step 580 microprocessor 92 begins its task by examining the status of CSM1 to see if it is active. If so, microprocessor 92 branches to step 587. If CSM1 is idle, then microprocessor 92 branches to step 582.

Microprocessor 92 enables CSM1 in step 582 by changing its status to active. Microprocessor 92 then forces clean-up to begin by bypassing Evaluate If Clean-up Is Necessary state 380 and setting CSM1 next state pointer to Choose Block to Clean-up state 382 in step 584. Its responsibilities fulfilled, microprocessor 92 branches from step 584 to step 586.

Microprocessor 92 ensures that CSM1 initiates clean-up in step 587, if it has not already done so. Microprocessor 92 does so by examining CSM1's next state pointer and if it is equal to evaluate clean-up necessary branching to step 584. This circumvents any evaluation that clean-up is unnecessary.

FIG. 31 illustrates an algorithm for Force Multi Cleanup 344. The task of this algorithm is to activate both clean-up state machines, if necessary.

The first two steps of Force Multi Cleanup 344 echo the steps of Force Cleanup 342. In step 590, microprocessor 92 determines whether CSM1 is active. If it is not, in step 592 CSM1 is enabled and choose block to copy state 382 is selected as the next state of CSM1. On the other hand, if CSM1 is already active, microprocessor 92 branches to step 591.

Microprocessor 92 determines whether CSM1 has begun clean-up in step 591. Recall that clean-up of a block is not initiated each time CSM1 is activated. Clean-up has begun if the next state pointer points to any state other than Evaluate If Clean-Up is necessary. In this case microprocessor 92 branches directly to step 594. Otherwise, microprocessor 92 proceeds to step 592.

There microprocessor 92 forces CSM1 to clean-up a block by resetting the CSM1 next state pointer to Choose Block to Clean-Up. Afterward, attention turns to CSM2 by the branch to step 594 from step 592.

Microprocessor 92 enables the second clean-up state machine, CSM2, in step 594. Microprocessor 92 then bypasses Evaluate If Clean-up Is Necessary state 380 and sets CSM2 next state pointer to choose block to copy state 382. Microprocessor 92 branches from step 594 to step 596, returning control to top level scheduler 150.

IV. Summary

Methods of allocating free physical memory in a solid state memory disk have been described. To increase data coherency, sectors of data are written into one block until there is no longer sufficient free memory to write another sector. When this occurs, according to one method, a block is selected for host writes if it includes the greatest amount of free physical memory. Sectors are then written into that block until there is no longer sufficient memory to write another sector. In contrast, according to a second method, a memory block that best fits the sector of data from the focus block is selected to receive writes from a clean-up process.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a solid state memory having a plurality of blocks of memory wherein a portion of each block is located in at least one associated nonvolatile memory device, a method of allocating free memory to a calling process for a unit of data having a variable given size, the method comprising the steps of:

A) selecting as a selected block a first block of memory to which data was last allocated if the first block has an amount of free memory equal to or greater than the given size;

B) if the amount of free memory in the first block is less than the given size, then 1) for each appropriate block of memory:

a) generating a first number corresponding to an amount of free memory in that block;

b) generating a second number corresponding to an amount of memory containing invalid data in that block; and c) summing the first and second numbers to generate a score;

2) selecting a second block having a greatest score as the select, block, if an amount of free memory in the selected block is not less than the given size; and C) reserving the given size of free memory in the selected block.

2. The method of claim 1 wherein the step of reserving the given size of free memory in the selected block further comprises the step of storing a first offset representative of the given size into a header in the selected block.

3. The method of claim 1 wherein appropriate blocks excludes at least one of the following types of blocks: blocks having a busy associated nonvolatile memory device, blocks having an associated nonvolatile memory device selected for clean-up, blocks selected for clean-up, bad blocks, blocks having a maximum number of headers already written into.

4. In a solid state memory having a plurality of blocks of memory wherein a portion of each block is located in at least one associated nonvolatile memory device, a method of allocating free memory to a calling process for a unit of data having a variable given size, the method comprising the steps of:

A) selecting as a selected block a first block of memory to which data was last allocated if the first block has an amount of free memory equal to or greater than the given size;

B) if the amount of free memory in the first block is less than the given size, then 1) for each appropriate block of memory:

a) generating a first number corresponding to an amount of free memory in that block:

b) generating a second number corresponding to a cycle count for that block; and c) summing the first and second numbers to generate a score;

2) selecting a second block having a greatest score as the selected block, if an amount of free memory in the selected block is not less than the given size; and C) reserving the given size of free memory in the selected block.

5. The method of claim 4 wherein the step of reserving the given size of free memory in the selected block further comprises the step of storing a first offset representative of the given size into a header in the selected block.

6. The method of claim 4 wherein appropriate blocks excludes at least one of the following types of blocks: blocks having a busy associated nonvolatile memory device, blocks having an associated nonvolatile memory device selected for clean-up, blocks selected for clean-up, bad blocks, blocks having a maximum number of headers already written into.

7. In a solid state memory having a plurality of blocks of memory wherein a portion of each block is located in at least one associated nonvolatile memory device, a method of allocating free memory to a calling process for a unit of data having a variable given size, the method comprising the steps of:

A) selecting as a selected block a first block of memory to which data was last allocated if the first block has an amount of free memory equal to or greater than the given size;

B) if the amount of free memory in the first block is less than the given size, then
1) for each appropriate block of memory:
   a) generating a first number corresponding to an amount of free memory in that block;
   b) generating a second number corresponding to an amount of memory containing invalid data as compared to a possible maximum amount of memory that can contain invalid data for all nonvolatile memory devices associated with that block; and
   c) summing the first and second numbers to generate a score;
2) selecting a second block having a greatest score as the selected block, if an amount of free memory in the selected block is not less than the given size; and C) reserving the given size of free memory in the selected block.

8. The method of claim 7 wherein the step of reserving the given size of free memory in the selected block further comprises the step of storing a first offset representative of the given size into a header in the selected block.

9. The method of claim 7 wherein appropriate blocks excludes at least one of the following types of blocks: blocks having a busy associated nonvolatile memory device, blocks having an associated nonvolatile memory device selected for clean-up, blocks selected for clean-up, bad blocks, blocks having a maximum number of headers already written into.

10. In a solid state memory having a plurality of blocks of memory wherein a portion of each block is located in at least one associated nonvolatile memory device, a method of allocating free memory to a calling process for a unit of data having a variable given size, the method comprising the steps of:

A) selecting as a selected block a first block of memory to which data was last allocated if the first block has an amount of free memory equal to or greater than the given size;

B) if the amount of free memory in the first block is less than the given size, then
1) for each appropriate block of memory:
   a) generating a first number corresponding to an amount of free memory in that block;
   b) generating a second number corresponding to a number of block portions already allocated in all nonvolatile memory devices associated with that block; and
   c) summing the first and second numbers to generate a score;
2) selecting a second block having a greatest score as the selected block, if an amount of free memory in the selected block is not less than the given size; and C) reserving the given size of free memory in the selected block.

11. The method of claim 10 wherein the step of reserving the given size of free memory in the selected block further comprises the step of storing a first offset representative of the given size into a header in the selected block.

12. The method of claim 10 wherein appropriate blocks excludes at least one of the following types of blocks: blocks having a busy associated nonvolatile memory device, blocks having an associated nonvolatile memory device selected for clean-up, blocks selected for clean-up, bad blocks, blocks having a maximum number of headers already written into.

* * * * *

UNITED STATES PATENT AND TRADEMARK OFFICE
CERTIFICATE OF CORRECTION

PATENT NO. : 5,535,369
DATED : July 9, 1996
INVENTOR(S) : Wells et al.

It is certified that error appears in the above-indentified patent and that said Letters Patent is hereby corrected as shown below:

In column 36 at line 34 delete "select," and insert --selected--

Signed and Sealed this

Twenty-seventh Day of May, 1997

Attest:

BRUCE LEHMAN

Attesting Officer

Commissioner of Patents and Trademarks